(12) United States Patent
Sakama et al.

(10) Patent No.: US 9,621,416 B2
(45) Date of Patent: Apr. 11, 2017

(54) METHOD FOR SETTING NETWORK INFORMATION IN COMMUNICATION DEVICE, COMMUNICATION SYSTEM, AND COMMUNICATION DEVICE

(71) Applicant: FUJITSU LIMITED, Kawasaki-shi, Kanagawa (JP)

(72) Inventors: Tadayuki Sakama, Yokohama (JP); Hiroki Hayashi, Yokohama (JP); Yuto Negishi, Jukaya (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 14/098,110

(22) Filed: Dec. 5, 2013

(65) Prior Publication Data

US 2014/0204798 A1 Jul. 24, 2014

(30) Foreign Application Priority Data

Jan. 22, 2013 (JP) ................. 2013-009669

(51) Int. Cl.
*H04L 12/28* (2006.01)
*H04L 12/24* (2006.01)
*H04L 29/12* (2006.01)

(52) U.S. Cl.
CPC ........ *H04L 41/0806* (2013.01); *H04L 41/085* (2013.01); *H04L 61/2007* (2013.01); *H04L 61/2046* (2013.01)

(58) Field of Classification Search
CPC ............. H04W 76/021; H04L 41/0806; H04L 61/2007; H04L 61/2046; H04L 41/085

(Continued)

(56) References Cited

U.S. PATENT DOCUMENTS

2007/0232281 A1 10/2007 Nakai et al.
2008/0130517 A1* 6/2008 Lee .................... H04L 41/0886
370/254

(Continued)

FOREIGN PATENT DOCUMENTS

JP 2000-222292 A 8/2000
JP 2002-077197 A 3/2002

(Continued)

OTHER PUBLICATIONS

U.S. Appl. No. 14/098,110, Shah R. Zaman.*

(Continued)

*Primary Examiner* — Jae Y Lee
*Assistant Examiner* — Shah R Zaman
(74) *Attorney, Agent, or Firm* — Arent Fox LLP

(57) ABSTRACT

A first communication device communicates with a second communication device based on first setting information stored in a first storage unit of the first communication device. The first communication device transmits the first setting information to the second communication device. The second communication device stores the first setting information received from the first communication device in a second storage unit. The first communication device receives, after first hardware of the first communication device is replaced, the first setting information stored in the second storage unit from the second communication device. The first communication device stores, after the replacement, the first setting information received from the second communication device in the first storage unit of the first communication device after the replacement.

8 Claims, 24 Drawing Sheets

(58) Field of Classification Search
USPC .......................................................... 370/254
See application file for complete search history.

(56) References Cited

U.S. PATENT DOCUMENTS

| | | | |
|---|---|---|---|
| 2009/0073990 A1* | 3/2009 | Patil | H04L 45/00 370/396 |
| 2009/0199291 A1* | 8/2009 | Hayasaka | H04L 63/0227 726/14 |
| 2009/0228611 A1* | 9/2009 | Ferguson | G06F 8/60 710/8 |
| 2010/0274917 A1* | 10/2010 | Cherchali | H04L 29/12216 709/230 |
| 2011/0283001 A1* | 11/2011 | Jung | H04W 28/16 709/227 |
| 2012/0198091 A1 | 8/2012 | Kanada et al. | |
| 2012/0264474 A1* | 10/2012 | Joh | H04W 52/0216 455/517 |
| 2012/0278796 A1* | 11/2012 | Sandlin | G06F 9/4411 717/174 |
| 2013/0067232 A1* | 3/2013 | Cheung | G06F 21/6209 713/176 |
| 2013/0205194 A1* | 8/2013 | Decker | G06F 17/21 715/234 |
| 2013/0205244 A1* | 8/2013 | Decker | G06F 17/21 715/777 |
| 2013/0237200 A1* | 9/2013 | Nystrom | H04W 8/20 455/418 |
| 2013/0332560 A1* | 12/2013 | Knight | H04L 67/02 709/217 |
| 2014/0066014 A1* | 3/2014 | Nicholson | H04W 12/08 455/411 |
| 2015/0089558 A1* | 3/2015 | Shimizu | H04N 5/765 725/96 |

FOREIGN PATENT DOCUMENTS

| | | |
|---|---|---|
| JP | 2007-243364 A | 9/2007 |
| JP | 2007-251637 A | 9/2007 |
| JP | 2011-250005 A | 12/2011 |
| JP | 2012-010140 A | 1/2012 |
| JP | 2012-156957 A | 8/2012 |

OTHER PUBLICATIONS

Japanese Office Action of related Japanese Patent Application No. 2013-009669 dated May 31, 2016.
Japanese Office Action of related Japanese Patent Application No. 2013-009669 dated Nov. 1, 2016.

* cited by examiner

FIG. 11

| IP ADDRESS | NET MASK | DEFAULT GATEWAY | LINE SPEED | MDI/MDI-X | FLOW CONTROL |
|---|---|---|---|---|---|
| 192.168.0.2 | 255.255.255.0 | 192.168.0.1 | 100 Mbps | Auto | On |

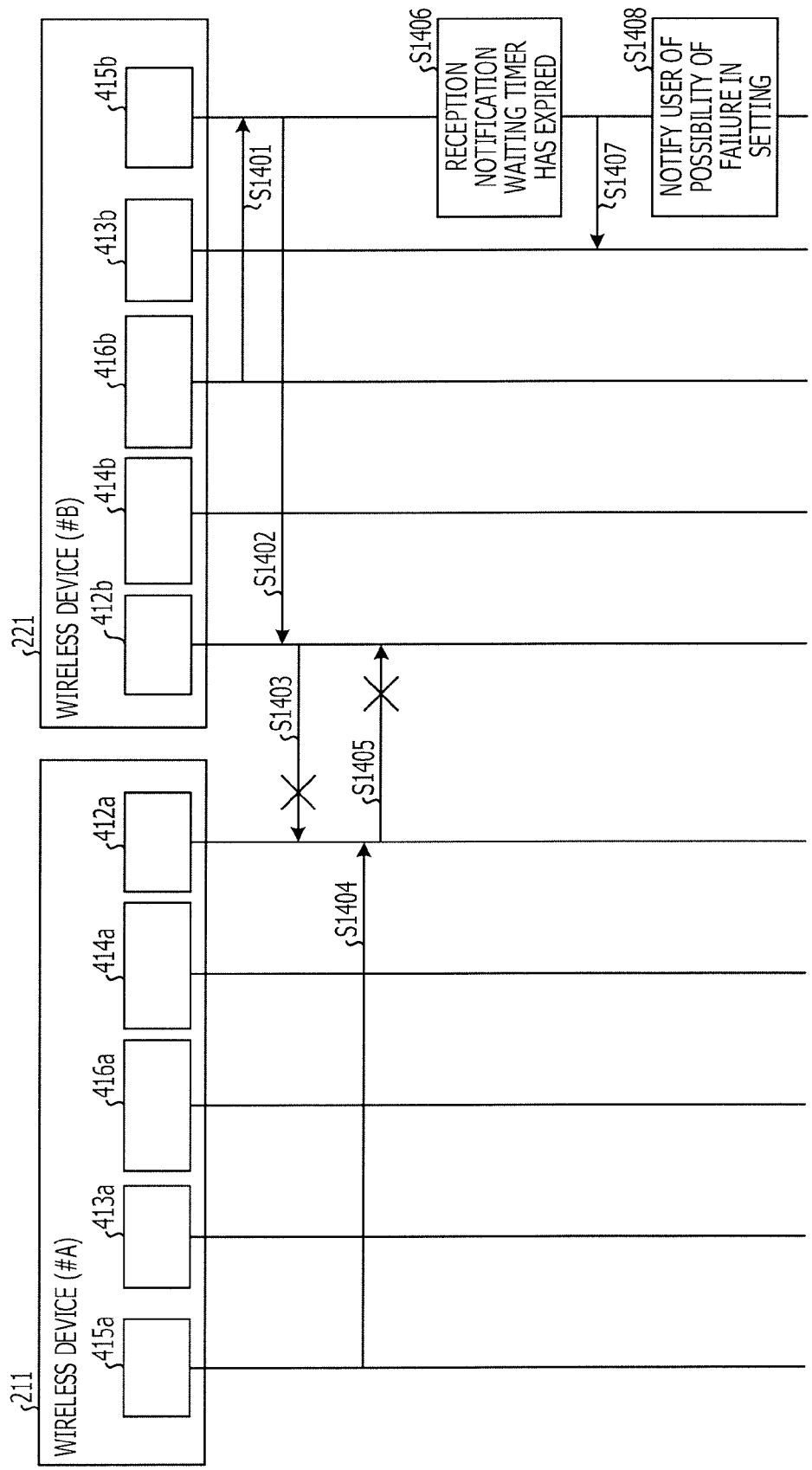

METHOD FOR SETTING NETWORK INFORMATION IN COMMUNICATION DEVICE, COMMUNICATION SYSTEM, AND COMMUNICATION DEVICE

CROSS-REFERENCE TO RELATED APPLICATION

This application is based upon and claims the benefit of priority of the prior Japanese Patent Application No. 2013-009669, filed on Jan. 22, 2013, the entire contents of which are incorporated herein by reference.

FIELD

The embodiments discussed herein are related to a method for setting network information in a communication device, a communication system, and a communication device.

BACKGROUND

According to a technique, at a stage before the start of connection to a wireless network, the initial setting is performed such that the media access control (MAC) address of a wireless relay device is used as the device address.

A multiplex wireless device may have a configuration made up of an indoor unit (IDU) that is placed indoors and an outdoor unit (ODU) that is placed outdoors, for example. In the configuration made up of the IDU and the ODU, writing of provisioning data, which is setting information for processing of the multiplex wireless device, may be performed by connection of a personal computer (PC) to a port of the IDU, for example. For this reason, re-writing of provisioning data at the time of device replacement due to a failure or the like may be performed indoors.

Changes in the style of use of a multiplex wireless device indicate a need for a multiplex wireless device made of an ODU that includes the function of an IDU. One of the benefits of such a device is its ease of installation.

A related technique is disclosed in, for example, Japanese Laid-open Patent Publication No. 2012-10140.

A problem with the related technique exists when a wireless device is replaced due to a failure in the wireless device or the like, but the network setting of the replaced wireless device is not automatically performed. For this reason, if the wireless device is placed outdoors, for example, network setting of the replaced wireless device is difficult.

SUMMARY

According to an aspect of the present invention, provided is a method for setting network information in a communication device. In the method, a first communication device communicates with a second communication device based on first setting information stored in a first storage unit of the first communication device. The first communication device transmits the first setting information to the second communication device. The second communication device stores the first setting information received from the first communication device in a second storage unit. The first communication device receives the first setting information stored in the second storage unit from the second communication device after first hardware of the first communication device is replaced. The first communication device stores the first setting information received from the second communication device in the first storage unit of the first communication device after the first hardware is replaced.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating an example of provisioning data;

FIG. 24 is a sequence diagram illustrating a second example of a process under an abnormal situation performed by a communication system.

DESCRIPTION OF EMBODIMENTS

An embodiment of a method for setting network information in a communication device, a communication system, and a communication device according to the present disclosure will be described in detail below.

Embodiment

Communication System According to Embodiment

Figure 1:
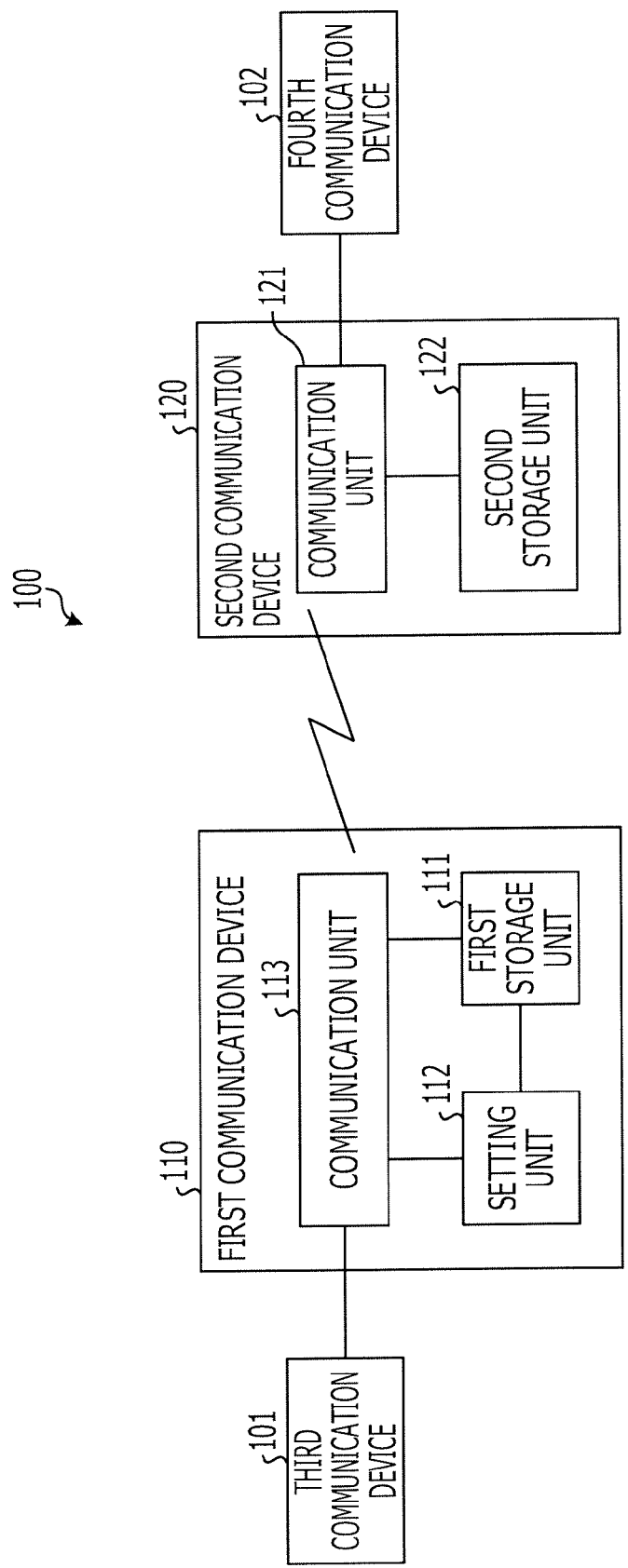
FIG. 1 is a block diagram illustrating an example of a communication system according to an embodiment.
Figure 2:
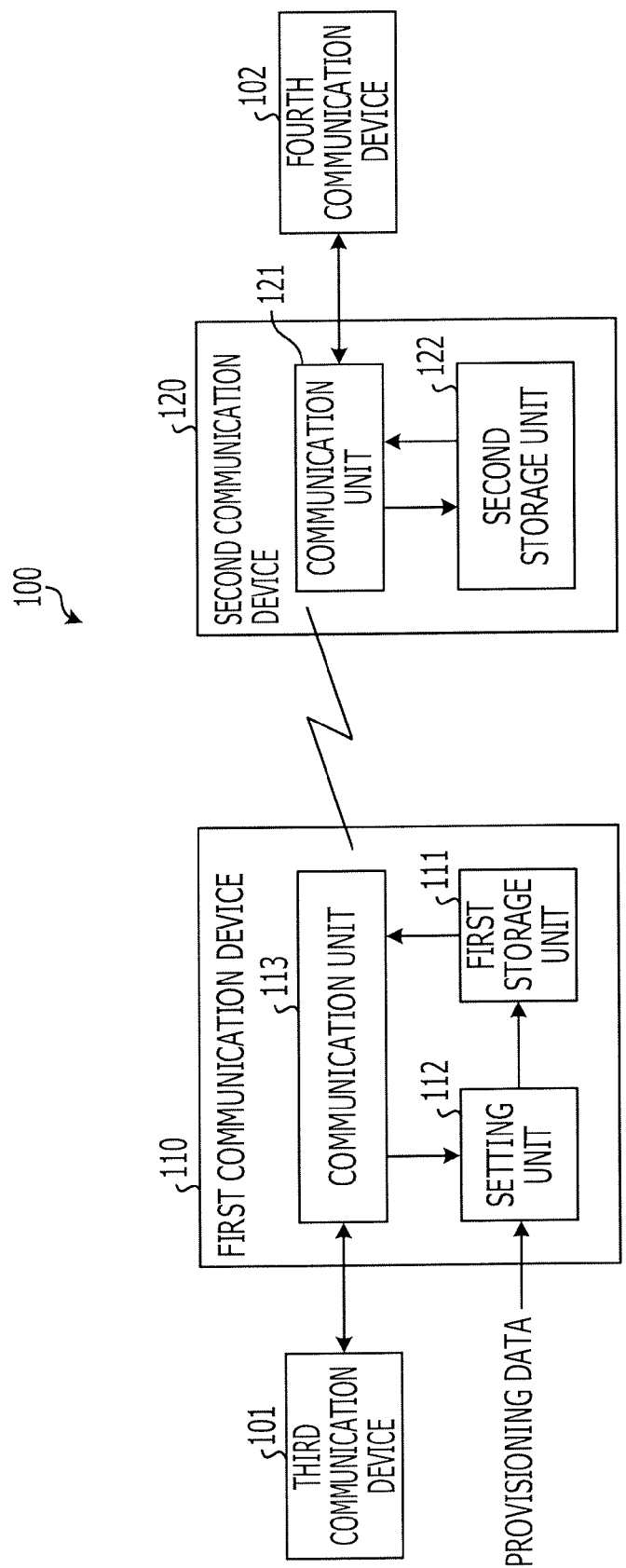
FIG. 2 illustrates an example of a flow of signals in a communication system according to an embodiment.

FIG. 1 is a block diagram illustrating an example of a communication system according to an embodiment. FIG. 2 illustrates an example of a flow of signals in the communication system according to the embodiment illustrated in FIG. 1. As illustrated in FIG. 1 and FIG. 2, a communication system 100 according to the embodiment may include a first communication device 110, a second communication device 120, a third communication device 101, and a fourth communication device 102.

The first communication device 110 and the second communication device 120 may wirelessly communicate with each other. The first communication device 110 may be connected to the third communication device 101. The third communication device 101 is a device constituting a network and is a communication device that may be included in the first communication device 110. The second communication device 120 may be connected to the fourth communication device 102. The fourth communication device 102 is a communication device included in a network and connected to the second communication device 120.

First Communication Device 110

The first communication device 110 may include a first storage unit 111, a setting unit 112, and a communication unit 113. In the first storage unit 111, a predetermined initial value may be stored in the initial state (for example, at the time of shipment from the factory).

When setting information is input to the first communication device 110, the setting unit 112 may replace the initial value stored in the first storage unit 111 with the input setting information. The input of the setting information to the first communication device 110 may, for example, be input by a user of the first communication device 110 via a PC connected to the first communication device 110. The setting information is information used for network setting of the first communication device 110. For example, the setting information may be provisioning data including an address of the first communication device 110 in communication of the communication system 100.

The communication unit 113 may communicate with the second communication device 120 in a wireless manner based on the setting information stored in the first storage unit 111. Also, the communication unit 113 may transmit setting information stored in the first storage unit 111 to the second communication device 120.

Also, the communication unit 113 may communicate with the third communication device 101 in a wired manner based on the setting information stored in the first storage unit 111. However, the communication unit 113 may also communicate with the third communication device 101 in a wireless manner.

Upon startup of the first communication device 110, the communication unit 113 may determine whether the initial value is stored in the first storage unit 111. If setting information set by the setting unit 112, instead of the initial value, is stored in the first storage unit 111, the communication unit 113 may communicate with the second communication device 120 and the third communication device 101, using the setting information stored in the first storage unit 111.

If the initial value is stored in the first storage unit 111, the communication unit 113 may receive setting information stored in a second storage unit 122 (described later) from the second communication device 120. For example, the communication unit 113 may transmit a request signal to the second communication device 120 and thus receive setting information from the second communication device 120. For example, the communication unit 113 may set an address based on the initial value stored in the first storage unit 111, for the first communication device 110, and may transmit a request signal to the second communication device 120.

When the communication unit 113 receives setting information from the second communication device 120, the setting unit 112 may replace the initial value stored in the first storage unit 111 with the setting information received by the communication unit 113. The communication unit 113 may communicate with the second communication device 120 and the third communication device 101 based on the setting information stored in the first storage unit 111, which has been replaced by the setting unit 112.

Second Communication Device 120

The second communication device 120 may include a communication unit 121 and the second storage unit 122. The communication unit 121 may communicate with the first communication device 110 in a wireless manner. Also, the communication unit 121 may receive from the first communication device 110 setting information of the first communication device 110. The communication unit 121 may cause the received setting information to be stored in the second storage unit 122.

Also, the communication unit 121 may communicate with the fourth communication device 102 in a wired manner. However, the communication unit 121 may also communicate with the fourth communication device 102 in a wireless manner. Upon receipt of information on a request for setting information from the first communication device 110, the communication unit 121 may transmit the setting information of the first communication device 110, which is stored in the second storage unit 122, to the first communication device 110.

If the first communication device 110 is replaced, the first communication device 110 after the replacement may receive, from the second communication device 120, setting information which is transmitted from the first communication device 110 before the replacement to the second communication device 120, and may set the setting information to the first communication device 110. This enables a network setting at the time of replacement of the first communication device 110 to be performed automatically.

Accordingly, the workload at the time of replacement of the first communication device 110 may be reduced. For this reason, even if the first communication device 110 is mounted at a place, such as a certain location on a steel tower, where it is difficult to perform work, for example, reduction in working hours in high places and reduction in the risk of an accident, such as accidentally dropping a PC, may be attained.

In some cases, the address based on the initial value stored in the first storage unit 111 of the first communication device 110 after replacement may be a provisional address with which the first communication device 110 is not able to communicate with the third communication device 101 and so on, and therefore remote control may not be possible via an Internet protocol (IP) network or the like. Even in such cases, the setting information that enables communication may be written to the first communication device 110 only by communication between the first communication device 110 and the second communication device 120.

Avoidance of Address Collision

In the case of setting, on the first communication device 110, an address based on the initial value stored in the first storage unit 111, the communication unit 113 may sever a communication path with the third communication device 101. The severance makes it possible to avoid a collision between the address of the first communication device 110 set based on the initial value and the address of the third communication device 101 or another communication device connected to the third communication device 101. The severance also makes it possible to avoid a collision between the address of the second communication device 120 and the address of the third communication device 101 or another communication device connected to the third communication device 101.

After replacing the initial value stored in the first storage unit 111 with the received setting information, the communication unit 113 may set an address based on setting information stored in the first storage unit 111, for the first communication device 110, and may establish a communication path with the third communication device 101. This makes it possible for the communication unit 113 to start communication with the third communication device 101 after setting, for the first communication device 110, an address that does not collide with the address of the third communication device 101 or another communication device connected to the third communication device 101.

In the case of setting, for the second communication device 120, an address available for communication with the first communication device 110 for which an address based on the initial value of the first communication device 110 has been set, the communication unit 121 may sever a communication path with the fourth communication device 102. The severance makes it possible to avoid a collision between the address of the second communication device 120 set so as to correspond to the address based on the initial value of the first communication device 110 and the address of the fourth communication device 102 or another communication device connected to the fourth communication device 102. The severance also makes it possible to avoid a collision between the address of the first communication device 110 and the address of the fourth communication device 102 or another communication device connected to the fourth communication device 102.

After severing the communication path with the fourth communication device 102 and transmitting the setting information, the communication unit 121 may set, for the second communication device 120, an address available for communication with the fourth communication device 102, and may establish connection of the communication path with the fourth communication device 102. This makes it possible for the communication unit 121 to start communication with the fourth communication device 102 after setting, for the second communication device 120, an address that does not collide with the address of the fourth communication device 102 or another communication device connected to the fourth communication device 102.

Application Example of Communication System

Figure 3:
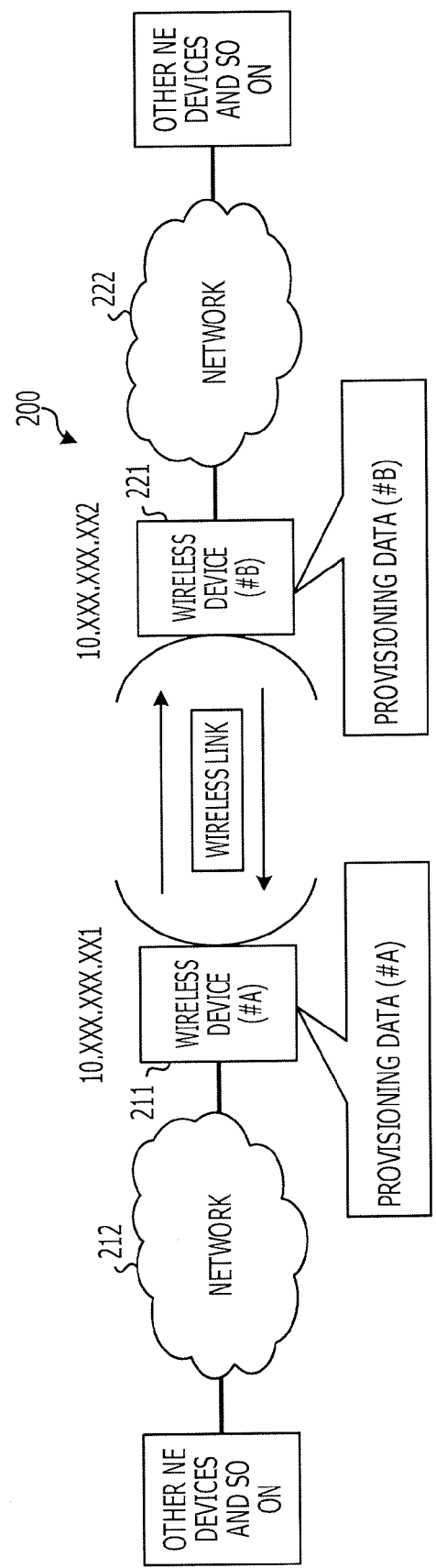
FIG. 3 illustrates an application example of a communication system.

FIG. 3 illustrates an application example of the communication system. The communication system 100 illustrated in FIG. 1 and FIG. 2 is applicable to a communication system 200 illustrated in FIG. 3 to FIG. 10, for example. As illustrated in FIG. 3, the communication system 200 may include a wireless device 211 (#A) and a wireless device 221 (#B).

The wireless device 211 may be connected to other network elements (NEs) and so on over a network 212. The wireless device 221 may be connected to other NEs and so on over a network 222.

The first communication device 110 illustrated in FIG. 1 and FIG. 2 corresponds to the wireless device 211 in FIG. 3, for example. The second communication device 120 illustrated in FIG. 1 and FIG. 2 corresponds to the wireless device 221 in FIG. 3, for example. The third communication device 101 illustrated in FIG. 1 and FIG. 2 is a device (not illustrated) that constitutes the network 212 in FIG. 3, and the fourth communication device 102 is a device (not illustrated) that constitutes the network 222 in FIG. 3, for example.

The wireless device 211 and the wireless device 221 together may form a wireless link through which they are able to wirelessly communicate with each other. For example, the wireless device 211 and the wireless device 221 may communicate with each other using multiplex wireless communication.

In the wireless device 211, provisioning data (#A) set for the ODU of the wireless device 211 may be stored. Then, the wireless device 211 may perform the network setting using the provisioning data (#A) at the time of startup of the wireless device 211, and may communicate with the network 212 and the wireless device 221.

In the wireless device 221, provisioning data (#B) set for the ODU of the wireless device 221 may be stored. Then, the wireless device 221 may perform the network setting using the provisioning data (#B) at the time of startup of the wireless device 221, and may communicate with the network 222 and the wireless device 211.

In the state illustrated in FIG. 3, a network parameter of 10. XXX. XXX. XX1 may be set on the wireless device 211, and a network parameter of 10. XXX. XXX. XX2 may be set on the wireless device 221. The network parameters may be IP addresses, for example.

Figure 4:
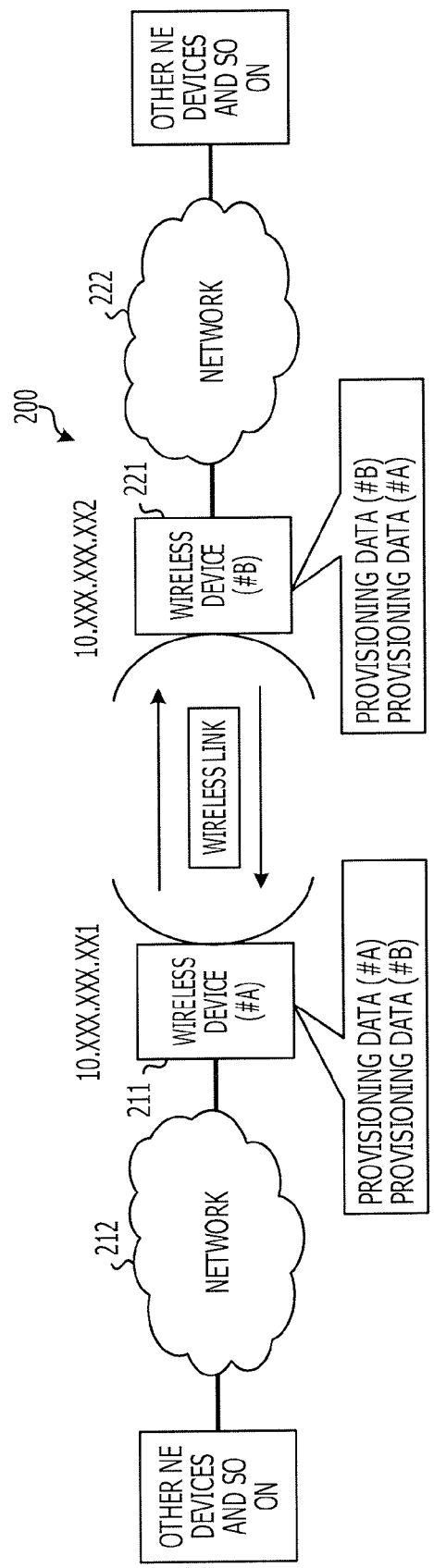
FIG. 4 illustrates an example of a state of a communication system under normal operations.

FIG. 4 illustrates an example of a state of the communication system under normal operations. In FIG. 4, the same portions as illustrated in FIG. 3 are denoted by the same reference numerals as in FIG. 3 and will not be further described. As illustrated in FIG. 4, the wireless device 211 may transmit the provisioning data (#A) of the ODU thereof to the wireless device 221 under normal operations of the communication system 200. The wireless device 221 may store (backs up) the provisioning data (#A) transmitted from the wireless device 211.

The wireless device 221 may transmit the provisioning data (#B) of the ODU thereof to the wireless device 211 under normal operations. The wireless device 211 may store (backs up) the provisioning data (#B) transmitted from the wireless device 221.

Accordingly, each of the wireless device 211 and the wireless device 221 may store both the provisioning data (#A) and the provisioning data (#B). The provisioning data may be transmitted using a supervisory control line (for example, an IP network) in the wireless link between the wireless device 211 and the wireless device 221, for example.

Figure 5:
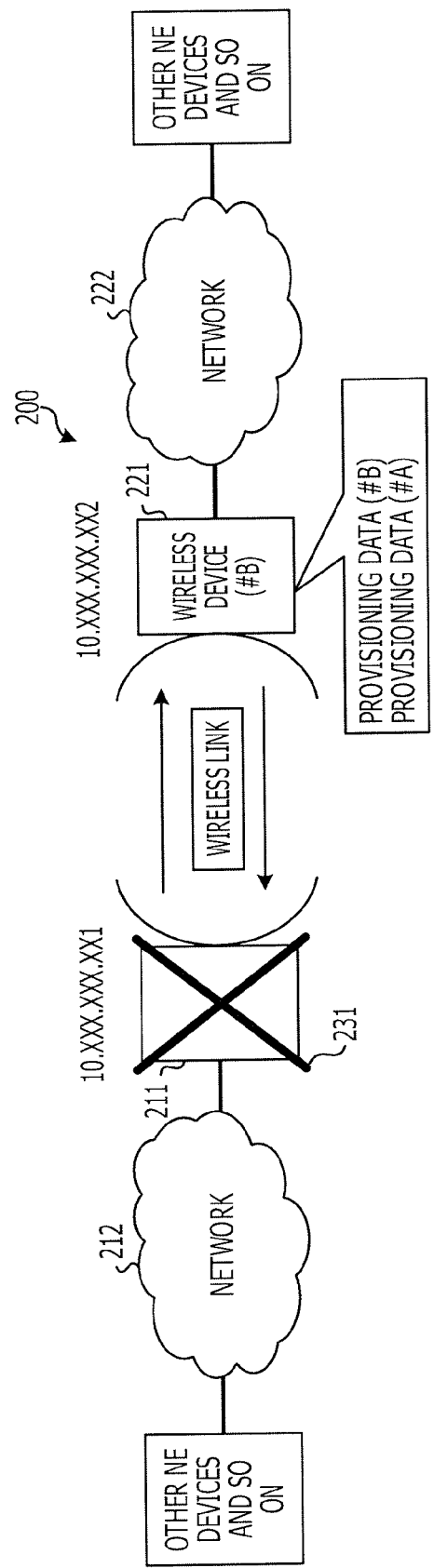
FIG. 5 illustrates an example of a state of a communication system under device failure conditions.

FIG. 5 illustrates an example of a state of the communication system under device failure conditions. In FIG. 5, the same portions as illustrated in FIG. 4 are denoted by the same reference numerals as in FIG. 4 and will not be further described. As illustrated in FIG. 5, it is assumed that a failure 231 occurs in the wireless device 211. Then, it is also assumed that the wireless device 211 is replaced with a new wireless device by the supervisor, for example.

Figure 6:
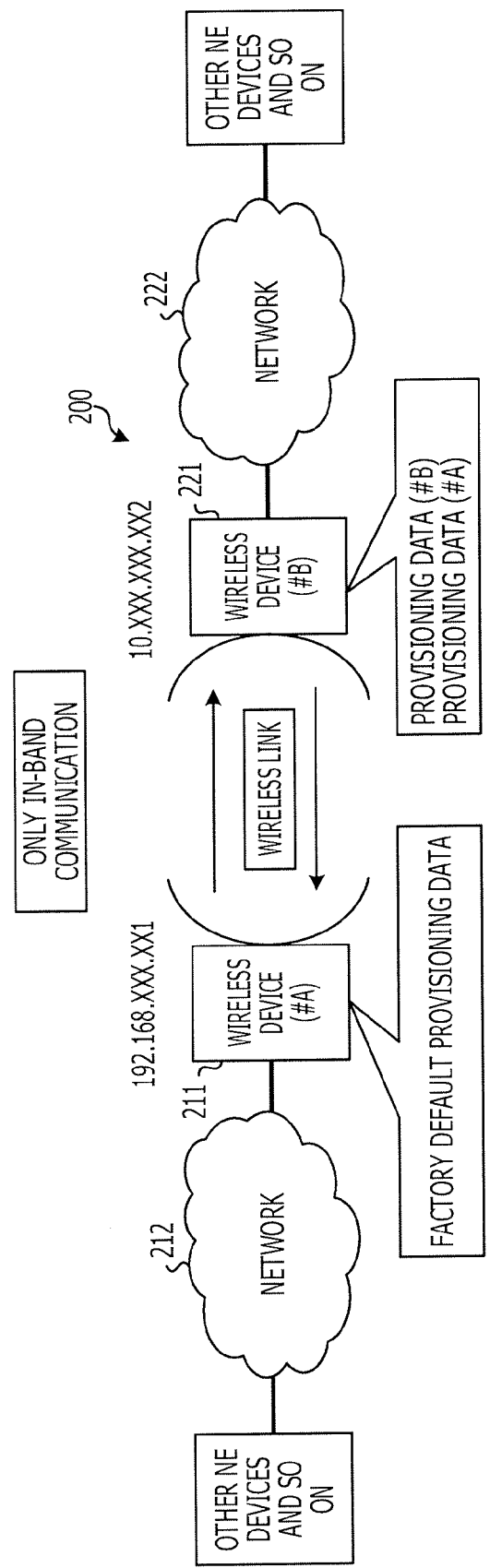
FIG. 6 illustrates an example of a state of a communication system upon device replacement.

FIG. 6 illustrates an example of a state of the communication system upon device replacement. In FIG. 6, the same portions as illustrated in FIG. 5 are denoted by the same reference numerals as in FIG. 5 and will not be further described. As illustrated in FIG. 6, the provisioning data of the wireless device 211 after the replacement is the provisioning data in the factory default state.

At this point, the IP network between the wireless device 211 and the wireless device 221 may not be established. For this reason, only in-band communication utilizing the wireless overhead may be available between the wireless device 211 and the wireless device 221.

In the state illustrated in FIG. 6, a network parameter of 192. 168. XXX. XX1 based on the factory default provisioning data may be set on the wireless device 211.

Figure 7:
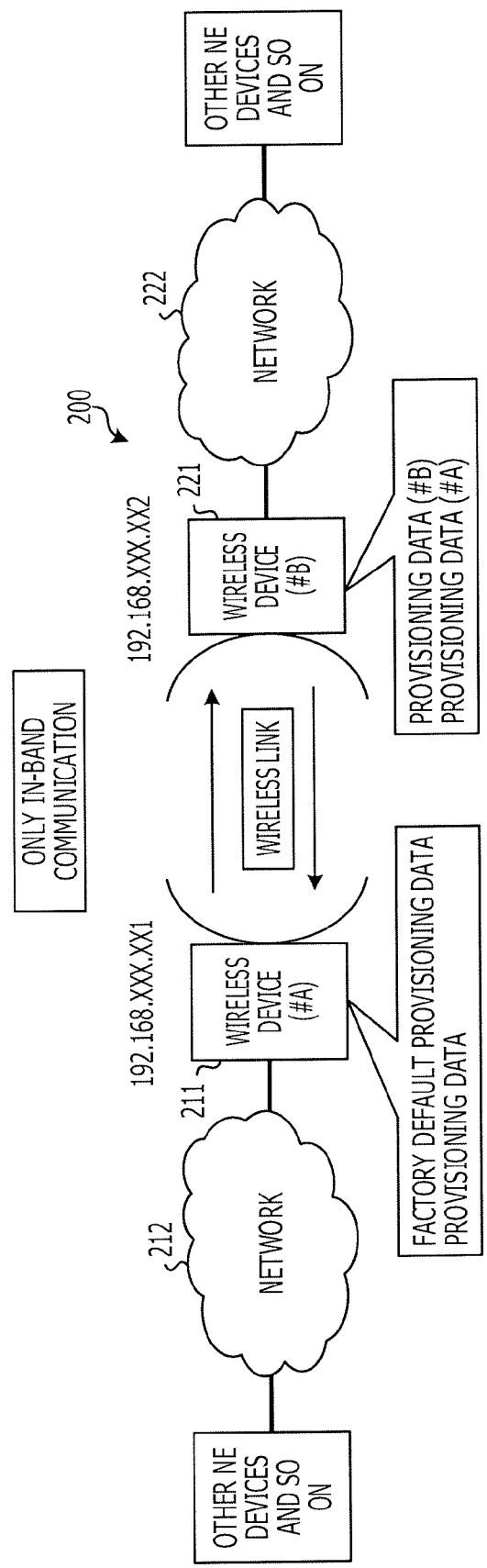
FIG. 7 illustrates an example of a state of a communication system when network parameters are unified.

FIG. 7 illustrates an example of a state of the communication system when network parameters are unified. In FIG. 7, the same portions as illustrated in FIG. 6 are denoted by the same reference numerals as in FIG. 6 and will not be further described. As illustrated in FIG. 7, the wireless device 221 may establish a network between the wireless device 211 and the wireless device 221 by temporarily changing the network parameter to a network parameter of 192. 168. XXX. XX2 used for setting the provisioning data.

Figure 8:
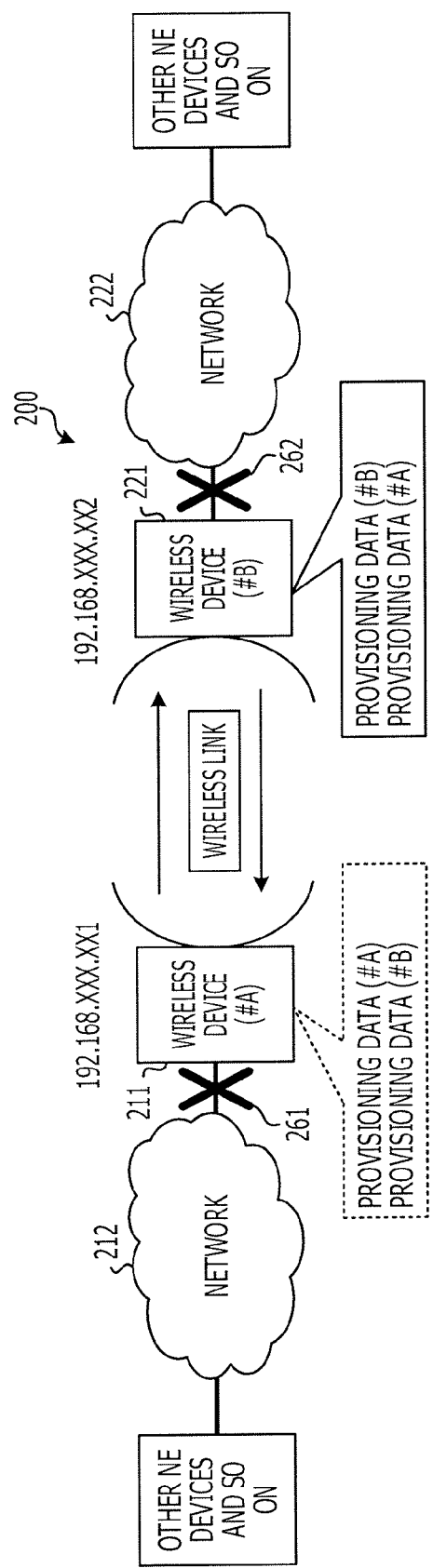
FIG. 8 illustrates an example of a state of a communication system at the time of severing connection at a line-side port.

FIG. 8 illustrates an example of a state of the communication system at the time of severing connection at a line-side port. In FIG. 8, the same portions as illustrated in FIG. 7 are denoted by the same reference numerals as in FIG. 7 and will not be further described. As illustrated in FIG. 8, the wireless device 211 may perform severance 261 of connection at a line-side port, which is connected with the network 212. Thereby, the wireless device 211 may be separated from other NEs connected to the network 212.

As illustrated in FIG. 8, the wireless device 221 may perform severance 262 of connection at a line-side port, which is connected with the network 222. Thereby, the wireless device 221 may be separated from other NEs connected to the network 222.

Under such conditions, the wireless device 221 may transmit the stored provisioning data (#A) and provisioning data (#8) to the wireless device 211 using the network established between the wireless device 221 and the wireless device 211. The wireless device 211 may store the provisioning data (#A) and provisioning data (#B) received from the wireless device 221.

Then, the wireless devices 211 and 221 may autonomously return to the state of FIG. 4, which is the normal provisioning state, and starts the operations. Thus, the provisioning data for the wireless device 211 may be set on the wireless device 211 after replacement, without connecting a PC or the like to the wireless device 211 to perform operations of writing of the provisioning data, for example.

Collision of Addresses When Connection at Line-side Port is Not Severed

Figure 9:
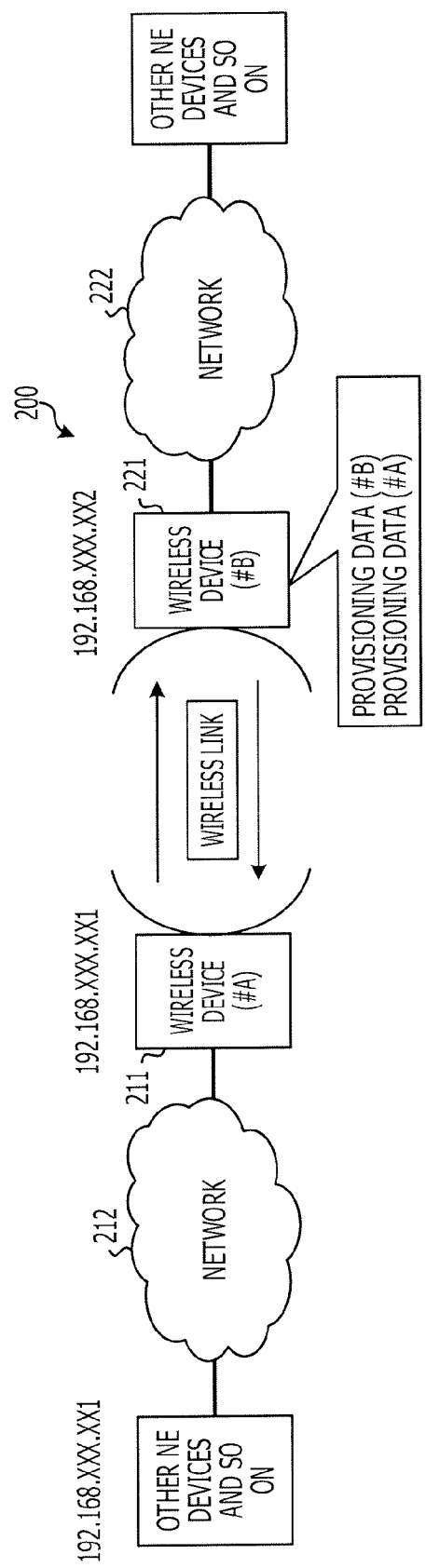
FIG. 9 illustrates an example of a collision between addresses when connection at a line-side port is not severed.

FIG. 9 illustrates an example of a collision between addresses when connection at the line-side port is not severed. In FIG. 9, the same portions as illustrated in FIG. 8 are denoted by the same reference numerals as in FIG. 8 and will not be further described. As illustrated in FIG. 9, it is assumed that one of the other NEs connected to the network 212 may have an address of 192.168. XXX. XX1.

In this case, if connection at the line-side port were not severed by the wireless device 211 (refer to FIG. 8), collision of addresses may occur between the one of the other NEs connected to the network 212 and the wireless device 211.

Figure 10:
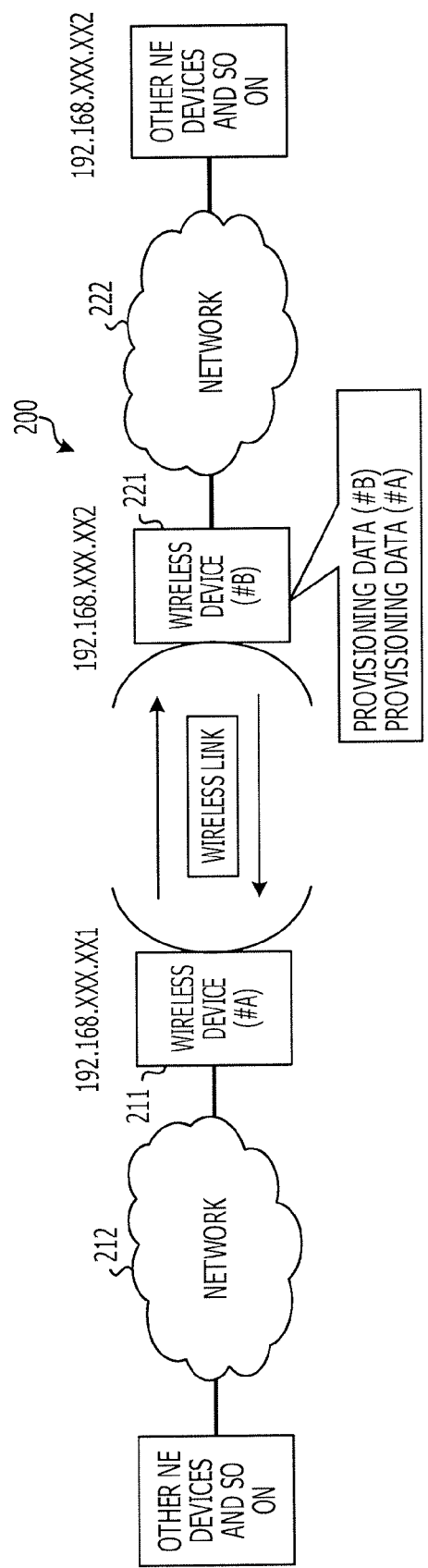
FIG. 10 illustrates an example of a collision between addresses when connection at a line-side port is not severed.

FIG. 10 illustrates another example of a collision between addresses when connection at the line-side port is not severed. In FIG. 10, the same portions as illustrated in FIG. 9 are denoted by the same reference numerals as in FIG. 9 and will not be further described. As illustrated in FIG. 10, it is assumed that one of the other NEs connected to the network 222 may have an address of 192.168. XXX. XX2.

In this case, if connection at the line-side port were not severed by the wireless device 221 (refer to FIG. 8), collision of addresses may occur between the one of the other NEs connected to the network 222 and the wireless device 221.

As illustrated in FIG. 9 and FIG. 10, if connection at the line-side ports to the networks 212 and 222 were not severed in the wireless devices 211 and 221, collision of addresses may occur between the wireless device 211 or 221 and other NEs. To address this, the wireless device 211 and the wireless device 221 may sever connection at the line-side ports, which are connected with the networks 212 and 222, respectively (refer to FIG. 8). Thereby, collision of addresses may be avoidable.

Provisioning Data

FIG. 11 is a diagram illustrating an example of provisioning data. Although the provisioning data (#A) of the wireless device 211 will be described with reference to FIG. 11, the description applies to the provisioning data (#B) of the wireless device 221.

Provisioning data 300 illustrated in FIG. 11 is the provisioning data (#A) of the wireless device 211. "IP address", "Net mask", "Default gateway", "Line speed", "MDI/MDI-X" and "Flow control" may be included in the provisioning data 300.

"IP address" is a network parameter that is used by the wireless device 211 in the communication system 200. "Net mask" is a mask value for extracting a network address from "IP address". "Default gateway" is the IP address of a gateway to which the wireless device 211 transmits a signal by default.

"Line speed" indicates the transmission speed of a line. "MDI/MDI-X" indicates the type (MDI or MDI-X) of a port. "Auto" in the column "MDI/MDI-X" indicates that the type of a port is automatically determined. "Flow control" indicates the presence or absence of flow control.

In this way, the provisioning data 300 may include, for example, information used for a network setup such as an IP address setting and port setting.

Configuration of Wireless Device

Figure 12:
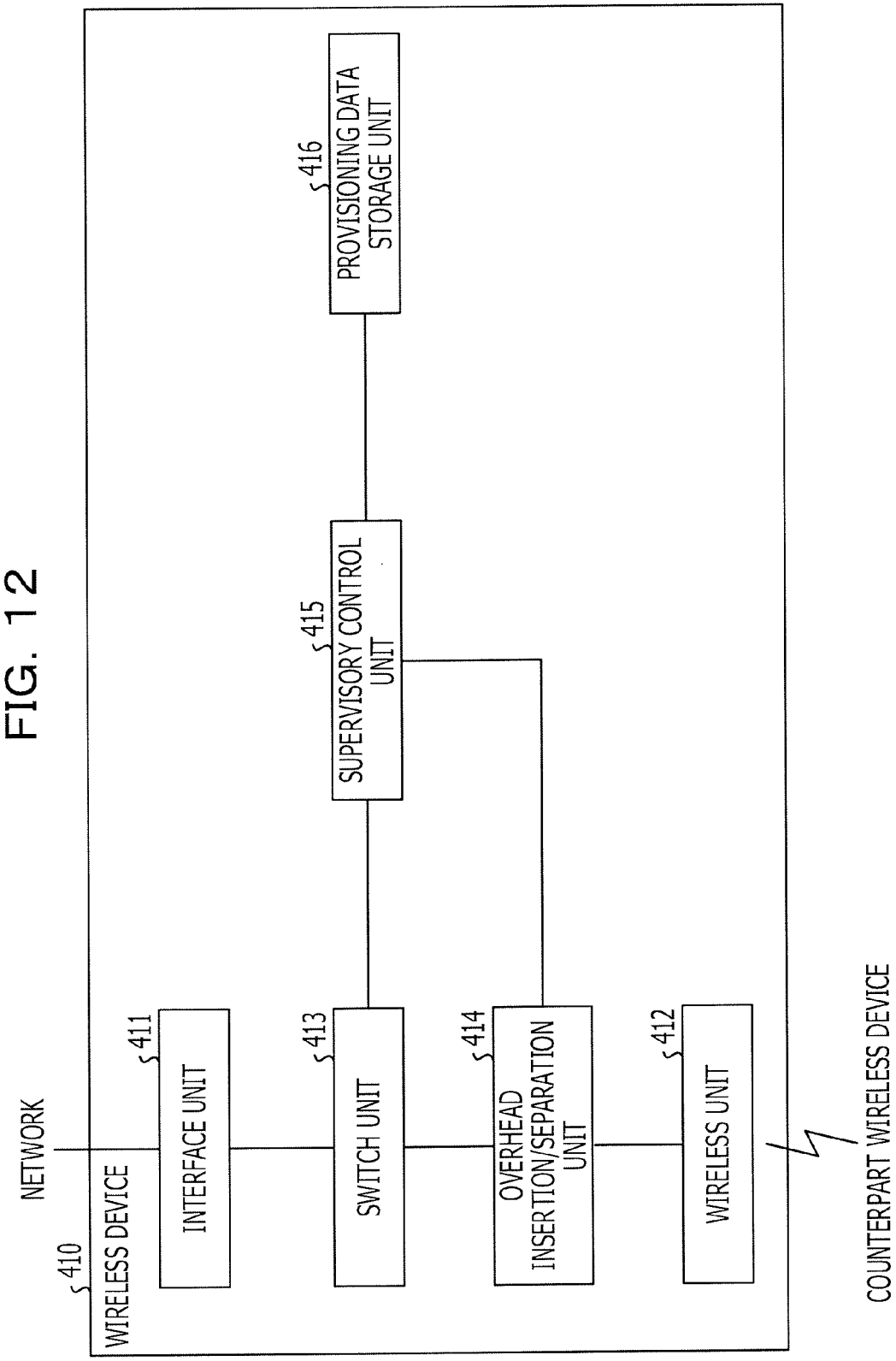
FIG. 12 is a block diagram illustrating an example of a configuration of a wireless device.
Figure 13:
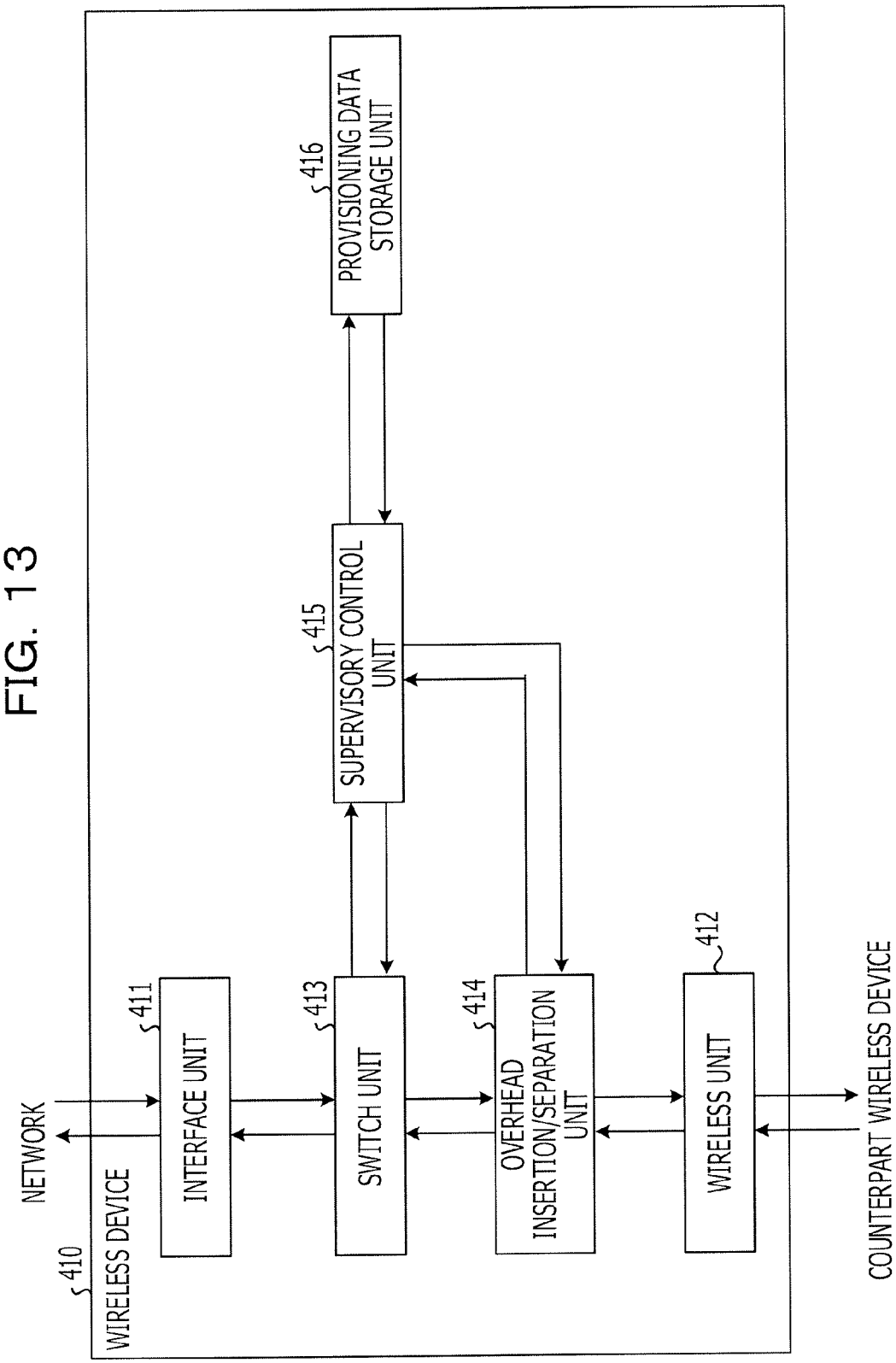
FIG. 13 illustrates an example of a flow of signals in a wireless device.

FIG. 12 is a block diagram illustrating an example of a configuration of a wireless device. FIG. 13 illustrates an example of a flow of signals in the wireless device illustrated in FIG. 12. Each of the wireless device 211 and wireless device 221 illustrated in FIG. 3 to FIG. 10 may be implemented by the wireless device 410 illustrated in FIG. 12 and FIG. 13, for example.

The wireless device 410 may include an interface unit 411, a wireless unit 412, a switch unit 413, an overhead insertion/separation unit 414, a supervisory control unit 415, and a provisioning data storage unit 416.

The interface unit 411 is an interface that performs wired communication between the wireless device 410 and other networks (for example, the networks 212 or 222). For example, the interface unit 411 may output reception signals (NETWORK-side reception signals) received from networks to the switch unit 413. The interface unit 411 may transmit transmission signals (NETWORK-side transmission signals) output from the switch unit 413 to other networks.

The wireless unit 412 may perform wireless communication between the wireless device 410 and the counterpart wireless device. For example, the wireless unit 412 may output reception signals (wireless-side reception signals with overheads) from the counterpart wireless device to the overhead insertion/separation unit 414. The wireless unit 412 may wirelessly transmit transmission signals (wireless-side transmission signals with overheads) output from the overhead insertion/separation unit 414 to the counterpart wireless device.

The switch unit 413 is a switch that switches between the main signal and the control signal based on switch control information received from the supervisory control unit 415. For example, the switch unit 413 may output signals (wireless-side transmission signals) to be transmitted by the wireless unit 412 among signals output from the interface unit 411, to the overhead insertion/separation unit 414. The switch unit 413 may output signals (network-side transmission signals) to be transmitted by the interface unit 411 among signals output from the overhead insertion/separation unit 414, to the interface unit 411.

The switch unit 413 may output control signals (communication received from network/wireless) over the wireless device 410 among signals output from the interface unit 411 or the overhead insertion/separation unit 414, to the supervisory control unit 415.

The overhead insertion/separation unit 414 may separate an overhead from a reception signal (wireless-side reception signal with an overhead) output from the wireless unit 412, and may output the separated overhead (reception overhead) to the supervisory control unit 415. Also, the overhead insertion/separation unit 414 may output the reception signal (wireless-side reception signal) from which the overhead has been separated, to the switch unit 413.

The overhead insertion/separation unit 414 may insert an overhead (transmission overhead) output from the supervisory control unit 415 to a transmission signal (wireless-side transmission signal) output from the switch unit 413. Then, the overhead insertion/separation unit 414 may output the transmission signal (wireless-side transmission signal with an overhead) with the inserted overhead to the wireless unit 412.

The supervisory control unit 415 may control the switch unit 413 and the overhead insertion/separation unit 414, and may supervise the entire wireless device 410. Also, the supervisory control unit 415 may back up provisioning data in the provisioning data storage unit 416, and may read provisioning data from the provisioning data storage unit 416. Detailed processing of the supervisory control unit 415 will be described later.

The supervisory control unit 415 may cause provisioning data input through a PC connected to the wireless device 410 to be stored in the provisioning data storage unit 416. The provisioning data storage unit 416 may store provisioning data of the wireless device 410 and the counterpart wireless device.

The first storage unit 111 illustrated in FIG. 1 and FIG. 2 may be implemented by the provisioning data storage unit 416, for example. The setting unit 112 illustrated in FIG. 1 and FIG. 2 may be implemented by the supervisory control unit 415, for example. The communication unit 113 illustrated in FIG. 1 and FIG. 2 may be implemented by the interface unit 411, the wireless unit 412, the switch unit 413, the overhead insertion/separation unit 414, and the supervisory control unit 415, for example.

Figure 14:
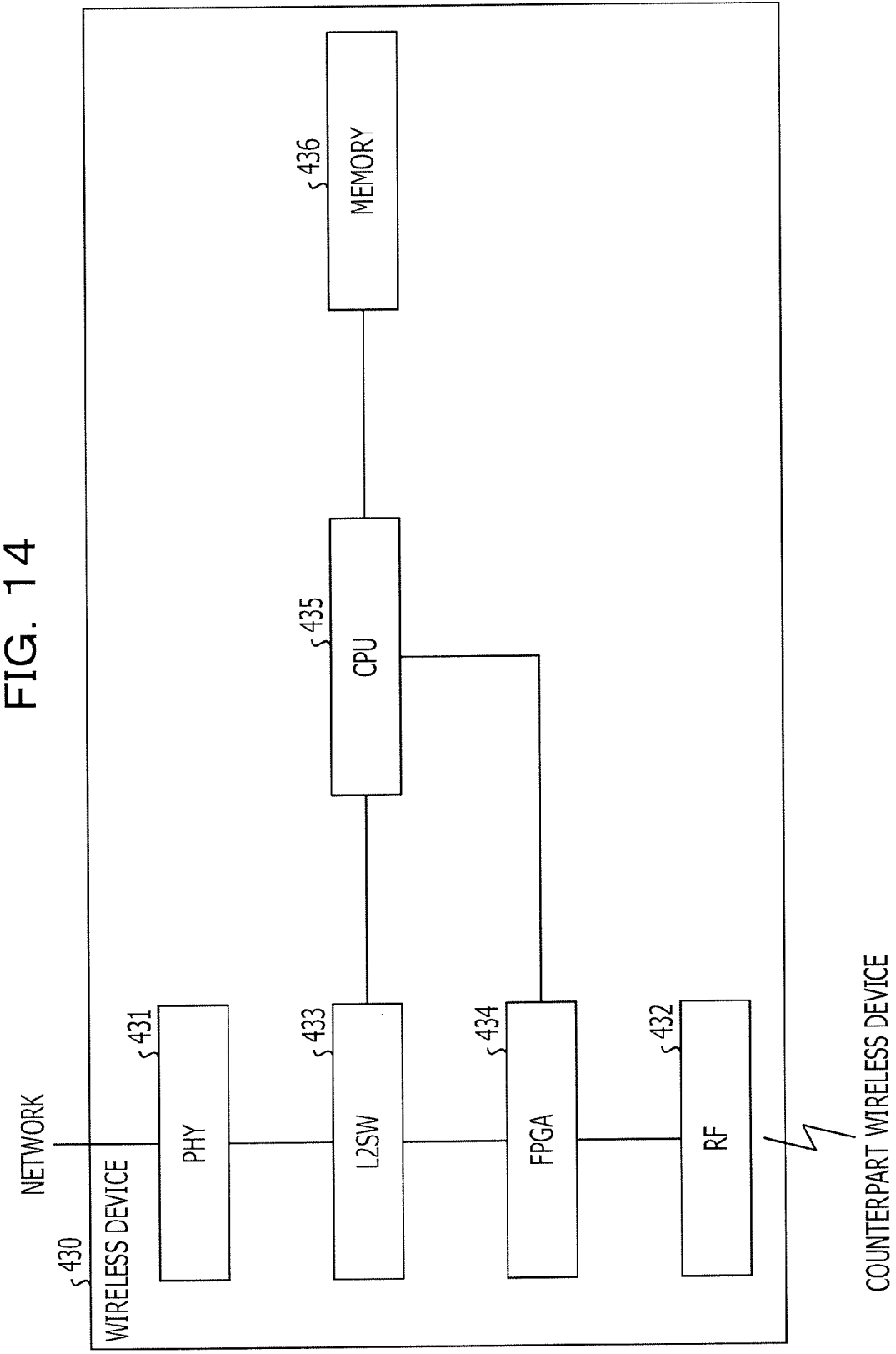
FIG. 14 is a block diagram illustrating an example of a hardware configuration of a wireless device.

FIG. 14 is a block diagram illustrating an example of a hardware configuration of a wireless device. The wireless device 410 illustrated in FIG. 12 and FIG. 13 may be implemented by a wireless unit 430 illustrated in FIG. 14, for example. The wireless device 430 may include a physical layer chip (PHY) 431, an RF 432, an L2SW 433, a field-programmable gate array (FPGA) 434 and a central processing unit (CPU) 435, and a memory 436.

The interface unit 411 illustrated in FIG. 12 and FIG. 13 may be implemented by the PHY 431, for example. The PHY 431 is a circuit for performing processing of the physical layer. The wireless unit 412 illustrated in FIG. 12 and FIG. 13 may be implemented by the RF 432, for example. The RF 432 is a circuit for processing wireless signals in a radio frequency (RF) band.

The switch unit 413 illustrated in FIG. 12 and FIG. 13 may be implemented by the L2SW 433, for example. The L2SW 433 is a switch for switching the layer 2. The overhead insertion/separation unit 414 illustrated in FIG. 12 and FIG. 13 may be implemented by the FPGA 434, for example.

The supervisory control unit 415 illustrated in FIG. 12 and FIG. 13 may be implemented by the CPU 435, for example. The provisioning data storage unit 416 illustrated in FIG. 12 and FIG. 13 may be implemented by the memory 436, for example.

Process of Wireless Device

Figure 15:
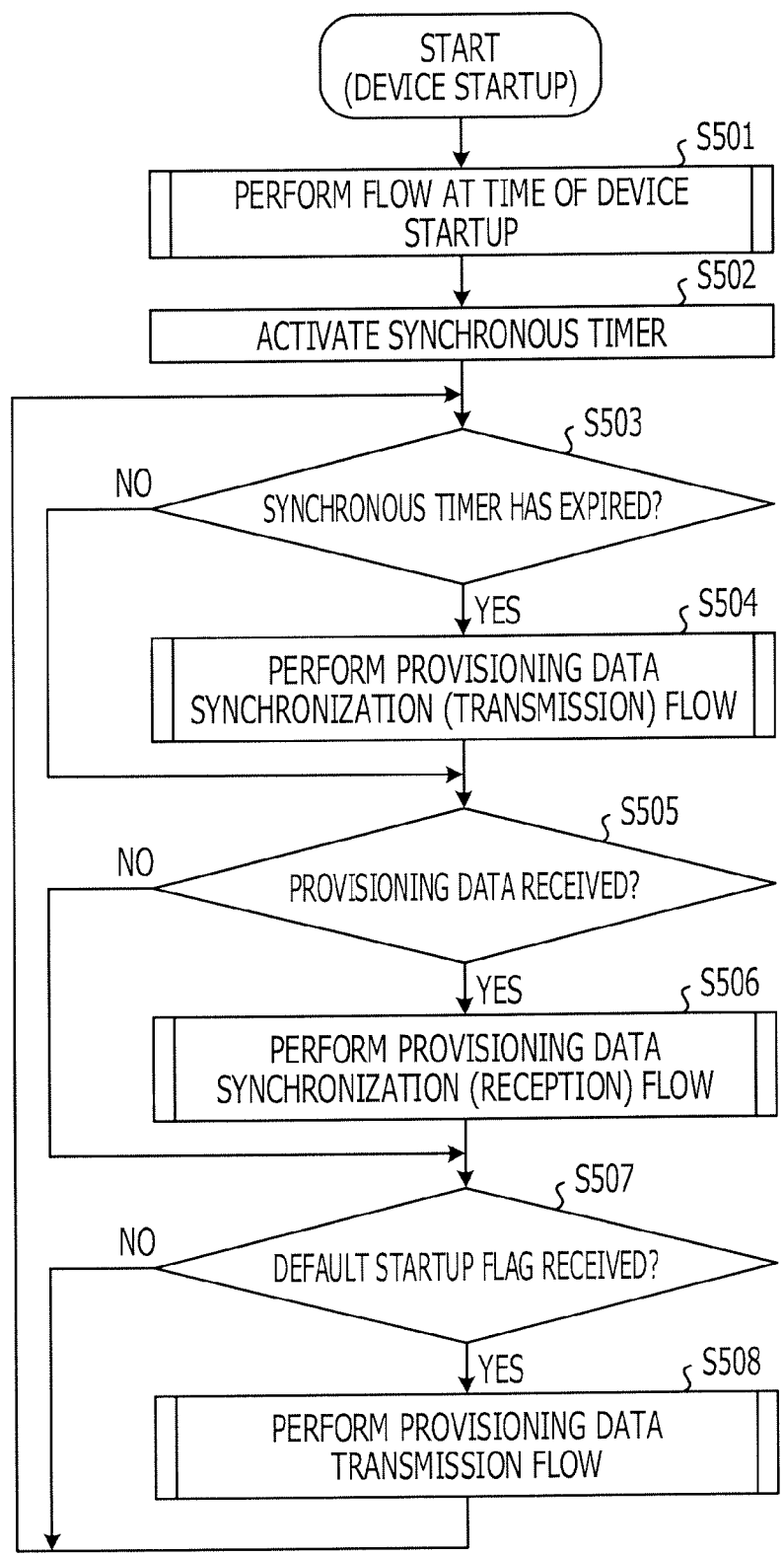
FIG. 15 is a flowchart illustrating an example of a process of a wireless device.

FIG. 15 is a flowchart illustrating an example of a process of a wireless device. The wireless device 410 may perform the following flow by control of the supervisory control unit 415, for example, at the time of startup. In FIG. 15, if the wireless device 410 is the wireless device 211, the wireless device 221 is referred to as the counterpart wireless device, whereas if the wireless device 410 is the wireless device 221, the wireless device 211 is referred to as the counterpart wireless device (the same applies to the subsequent flowcharts).

First, the wireless device 410 may perform the flow at the time of device startup (S501). The flow at the time of device startup at S501 will be described later (refer to FIG. 16). Then, the wireless device 410 may activate a synchronous timer that times a certain period of time (S502). Then, the wireless device 410 may determine whether the synchronous timer activated at S502 has expired (S503).

At S503, if the synchronous timer has not expired (No at S503), the wireless device 410 may proceed to S505. If the synchronous timer has expired (Yes at S503), the wireless device 410 may perform a provisioning data synchronization (transmission) flow (S504). At this point, the wireless device 410 may reinitialize the synchronous timer. The provisioning data synchronization (transmission) flow at S504 will be described later (refer to FIG. 17).

Then, it may be determined whether the wireless device 410 has received provisioning data from the counterpart wireless device (S505). If provisioning data has not been received (No at S505), the wireless device 410 may proceed to S507. If provisioning data has been received (Yes at S505), the wireless device 410 may perform a provisioning data synchronization (reception) flow (S506). The provisioning data synchronization (reception) flow of S506 will be described later (refer to FIG. 18).

Then, it may be determined whether the wireless device 410 has received a default startup flag from the counterpart wireless device (S507). If the wireless device 410 has not received a default startup flag (No at S507), the wireless device 410 may return to S503. If a default startup flag has been received (Yes at S507), the wireless device 410 may perform a provisioning data transmission flow (S508), and return to S503. The provisioning data transmission flow of S508 will be described later (refer to FIG. 19).

By following the above flow, the provisioning data synchronization (transmission) flow (refer to FIG. 17) may be performed periodically. Additionally, if provisioning data is received from the counterpart wireless device, the provisioning data synchronization (reception) flow (refer to FIG. 18) may be performed. Additionally, if a default startup flag is received from the counterpart wireless device, the provisioning data transmission flow (refer to FIG. 19) may be performed.

Figure 16:
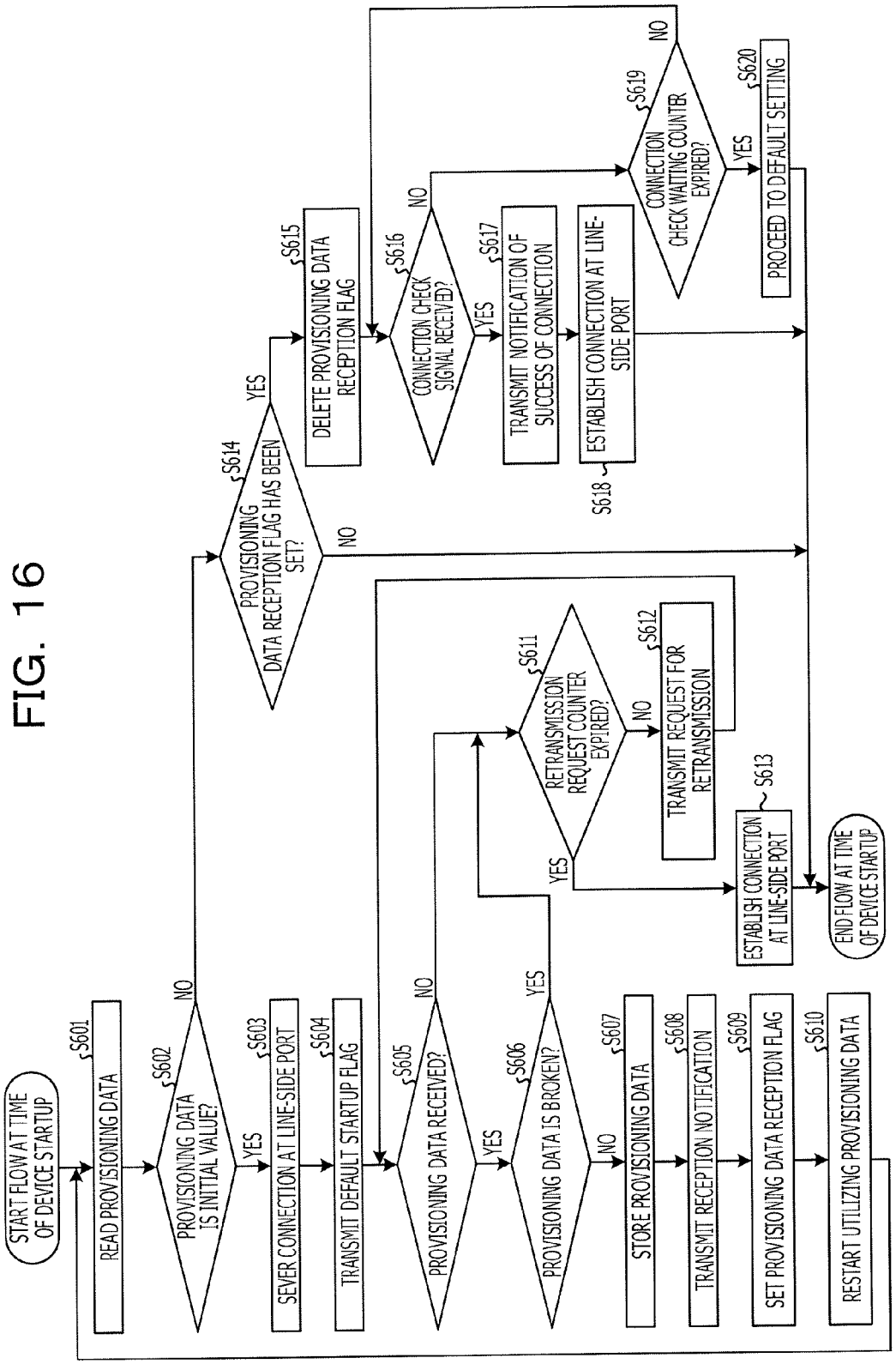
FIG. 16 is a flowchart illustrating an example of a flow at the time of device startup.

FIG. 16 is a flowchart illustrating an example of the flow at the time of device startup illustrated in FIG. 15. The wireless device 410 may perform the following flow, for example, as the flow at the time of device startup of S501 illustrated in FIG. 15. First, the wireless device 410 may read provisioning data stored therein (S601).

Then, the wireless device 410 may determine whether the provisioning data read at S601 is the initial value (S602). For example, the wireless device 410, in which the initial value of provisioning data is stored, may make the determination by comparing the read provisioning data with the stored initial value.

At S602, if the read provisioning data is the initial value (Yes at S602), the wireless device 410 may sever connection at the line-side port (S603). For example, the wireless device 410 may block communication through the interface unit 411. Then, the wireless device 410 may transmit a default startup flag to the counterpart wireless device (S604).

Then, it may be determined whether the wireless device 410 has received provisioning data from the counterpart wireless device (S605). If provisioning data has been received (Yes at S605), the wireless device 410 may determine whether the received provisioning data is broken (S606). If the received provisioning data is not broken (No at S606), the wireless device 410 may store the received provisioning data (S607).

Then, the wireless device 410 may transmit, to the counterpart wireless device, a reception notification indicating that provisioning data has been received (S608). Then, the wireless device 410 may set a provisioning data reception flag in a nonvolatile memory (for example, the memory 436) of the wireless device 410 (S609). Then, utilizing the provisioning data stored at S607, the wireless device 410 may restart (S610), and return to S601.

If provisioning data has not been received at S605 (No at S605), or if provisioning data is broken at S606 (Yes at S606), the wireless device 410 may proceed to S611. That is, the wireless device 410 may determine whether a retransmission request counter has expired (S611). The retransmission request counter is a counter that is counted up each time the operation of S611 is performed, for example. For example, the wireless device 410 may determine that the retransmission request counter has expired if the count value of the retransmission request counter has reached a predetermined value.

If the retransmission request counter has not expired (No at S611), the wireless device 410 may transmit a request for retransmission of provisioning data to the counterpart wireless device (S612), and may return to S605. If the retransmission request counter has expired (Yes at S611), the wireless device 410 may establish connection at the line-side port (S613), and end a series of processing of the flow at the time of device startup. At S613, the wireless device 410 may establish communication using the interface unit 411 blocked at S603 to be established.

If the read provisioning data is not the initial value (No at S602), the wireless device 410 may determine whether a provisioning data reception flag has been set at S609 (S614). If a provisioning data reception flag has not been set (No at S614), the wireless device 410 may end a series of processing of the flow at the time of device startup.

If a provisioning data reception flag has been set (Yes at S614), the wireless device 410 may delete the provisioning data reception flag (S615).

Then, it may be determined whether the wireless device 410 has received a connection check signal from the counterpart wireless device (S616). If a connection check signal has been received (Yes at S616), the wireless device 410 may transmit a notification of the success of connection to the counterpart wireless device (S617). Then, the wireless device 410 may establish connection at the line-side port (S618), and end a series of processing of the flow at the time of device startup.

If a connection check signal has not been received (No at S616), the wireless device 410 may determine whether a connection check waiting counter has expired (S619). The connection check waiting counter is a counter that is counted up each time the operation of S619 is performed. For example, the wireless device 410 may determine that the connection check waiting counter has expired if the count value of the connection check waiting counter has reached a predetermined value.

If the connection check waiting counter has not expired (No at S619), the wireless device 410 may proceed to S616. If the connection check waiting counter has expired (Yes at S619), the wireless device 410 may proceed to default setting (S620), and end a series of processing of the flow at the time of device startup.

By following the above flow, if the stored provisioning data is the initial value, the wireless device 410 may sever connection at the line-side port, receive provisioning data from the counterpart wireless device, and restart. If the stored provisioning data is not the initial value, the wireless device 410 may establish connection at the line-side port and perform communication.

Figure 17:
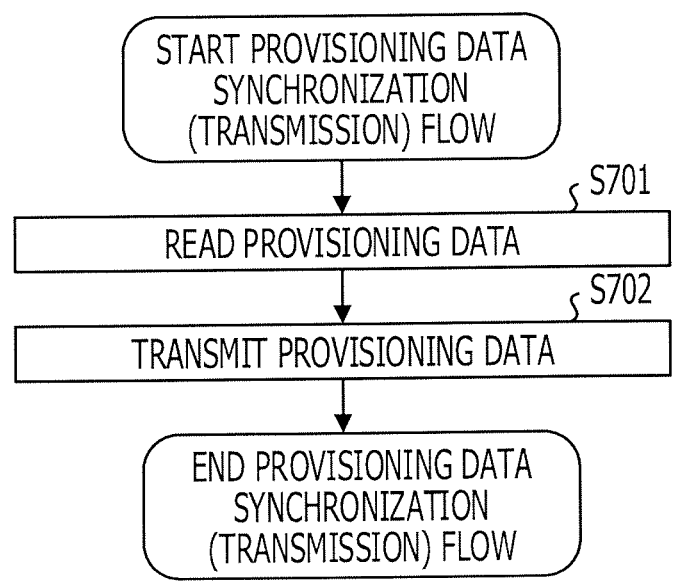
FIG. 17 is a flowchart illustrating an example of a provisioning data synchronization (transmission) flow.

FIG. 17 is a flowchart illustrating an example of the provisioning data synchronization (transmission) flow illustrated in FIG. 15. The wireless device 410 may perform the following flow, for example, as the provisioning data synchronization (transmission) flow of S504 illustrated in FIG. 15. First, the wireless device 410 may read the provisioning data thereof, which is stored in the wireless device 410 (S701).

Then, the wireless device 410 may transmit the provisioning data read at S701 to the counterpart wireless device (S702), and end a series of processing of the provisioning data synchronization (transmission) flow.

Figure 18:
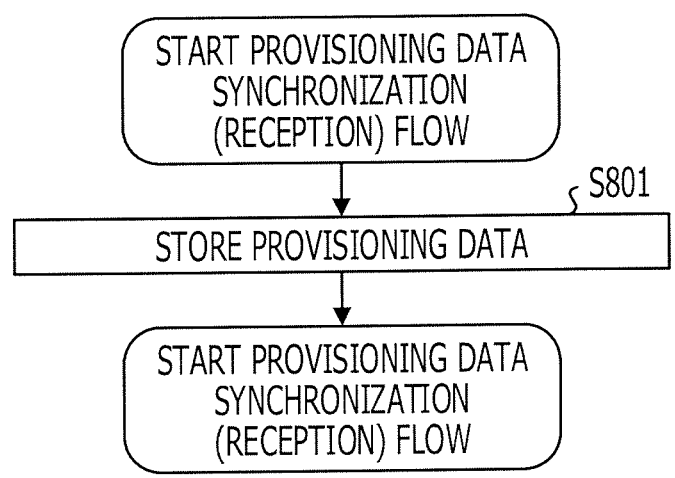
FIG. 18 is a flowchart illustrating an example of a provisioning data synchronization (reception) flow.

FIG. 18 is a flowchart illustrating an example of the provisioning data synchronization (reception) flow illustrated in FIG. 15. The wireless device 410 may perform the following flow, for example, as the provisioning data synchronization (reception) flow of S506 illustrated in FIG. 15. The wireless device 410 may store the provisioning data received at S505 illustrated in FIG. 15 (S801), and end a series of processing of the provisioning data synchronization (reception) flow.

Figure 19:
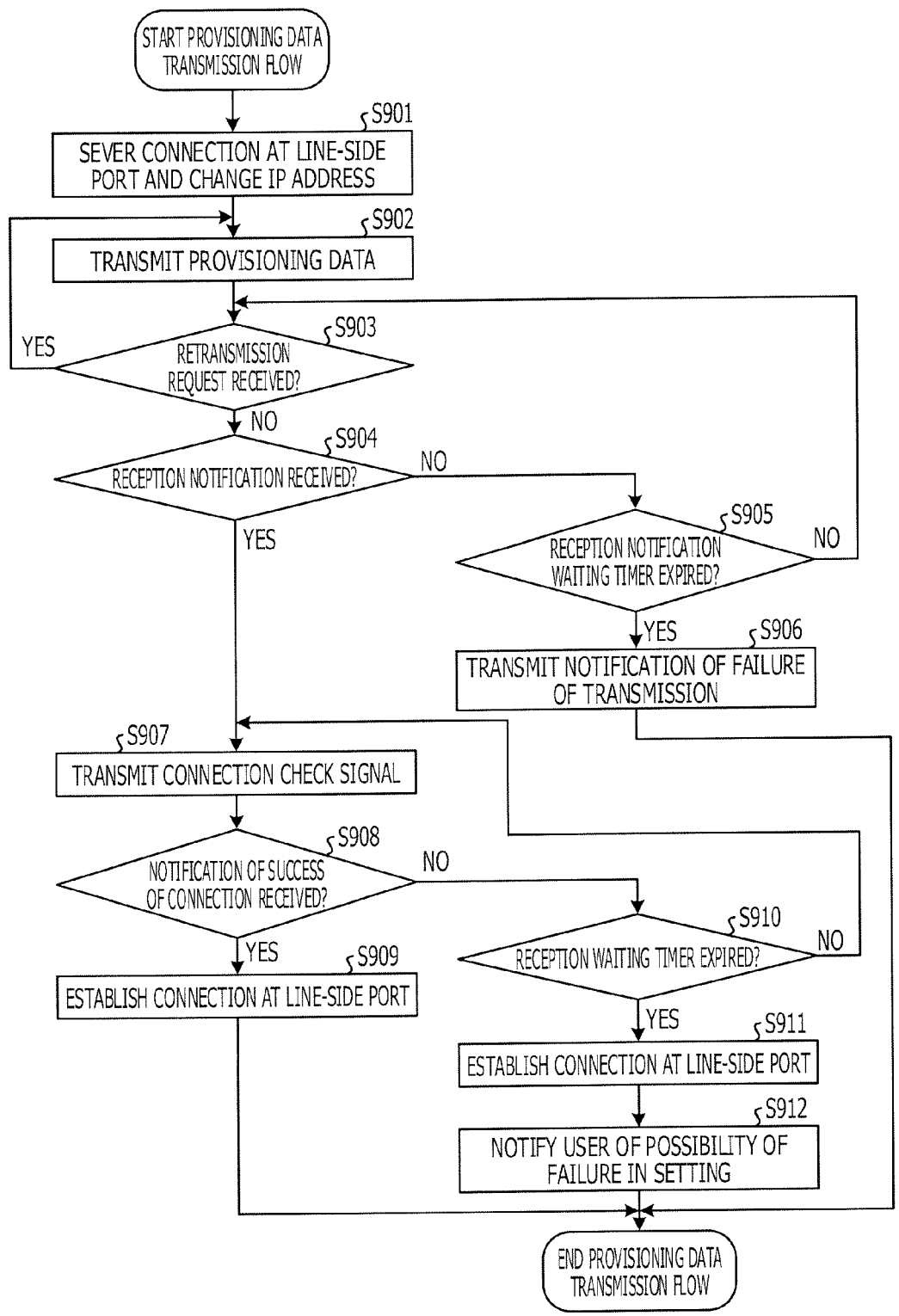
FIG. 19 is a flowchart illustrating an example of a provisioning data transmission flow.

FIG. 19 is a flowchart illustrating an example of the provisioning data transmission flow illustrated in FIG. 15. The wireless device 410 may perform the following flow, for example, as the provisioning data transmission flow of S508 illustrated in FIG. 15. First, the wireless device 410 may sever connection at the line-side port, and change the IP address, thereby shifting to the provisioning data transmission mode (S901). At S901, the wireless device 410 may set the IP address to a predetermined IP address (for example, "192. 168. XXX. XX1") based on the factory default provisioning data, for example.

Then, the wireless device 410 may read provisioning data of the counterpart wireless device, and transmit the read provisioning data to the counterpart wireless device (S902). Then, it may be determined whether the wireless device 410 has received a retransmission request from the counterpart wireless device (S903). If a retransmission request has been received (Yes in S903), the wireless device 410 may return to S902.

If a retransmission request has not been received (No at S903), it may be determined whether the wireless device 410 has received a reception notification from the counterpart wireless device (S904). If a reception notification has not been received (No at S904), the wireless device 410 may determine whether a reception notification waiting timer has expired (S905). The reception notification waiting timer is a counter that is counted up each time the operation of S905 is performed, for example. For example, the wireless device 410 may determine that the reception notification waiting timer has expired if the count value of the reception notification waiting timer has reached a predetermined value.

If the reception notification waiting timer has not expired (No at S905), the wireless device 410 may return to S903. If the reception notification waiting timer has expired (Yes at S905), the wireless device 410 may transmit a notification of the failure of transmission to the counterpart wireless device (S906), and end a series of processing of the provisioning data transmission flow. At this point, the wireless device 410 may establish connection at the line-side port that has been severed at S901, and return the IP address changed at S901 to the original state.

If a reception notification has been received (Yes at S904), the wireless device 410 may transmit a connection check signal to the counterpart wireless device (S907). Then, it may be determined whether the wireless device 410 has received a notification of the success of connection from the counterpart wireless device (S908). If a notification of the success of connection has been received (Yes at S908), the wireless device 410 may establish connection at the line-side port (S909), and end a series of processing of the provisioning data transmission flow. At this point, the wireless device 410 may restore the IP address changed at S901 to the original state.

At S908, if a notification of the success of connection has not been received (No at S908), the wireless device 410 may determine whether a reception waiting timer has expired (S910). The reception waiting timer is a counter that is counted up each time the operation of S910 is performed, for example. For example, the wireless device 410 may determine that the reception waiting timer has expired if the count value of the reception waiting timer has reached a predetermined value. If the reception waiting timer has not expired (No at S910), the wireless device 410 may return to S907.

If the reception waiting timer has expired (Yes at S910), the wireless device 410 may establish connection at the line-side port (S911). Also, the wireless device 410 may notify the user of the possibility of failure in setting (S912), and end a series of processing of the provisioning data transmission flow. At this point, the wireless device 410 may restore the IP address changed at S901 to the original state.

By following the above flow, the provisioning data of the counterpart wireless device may transmitted to the counterpart wireless device under the condition where connection at the line-side port is severed, and, after the transmission, connection at the line-side port is established, so that communication may be resumed.

Process of Communication System

Figure 20:
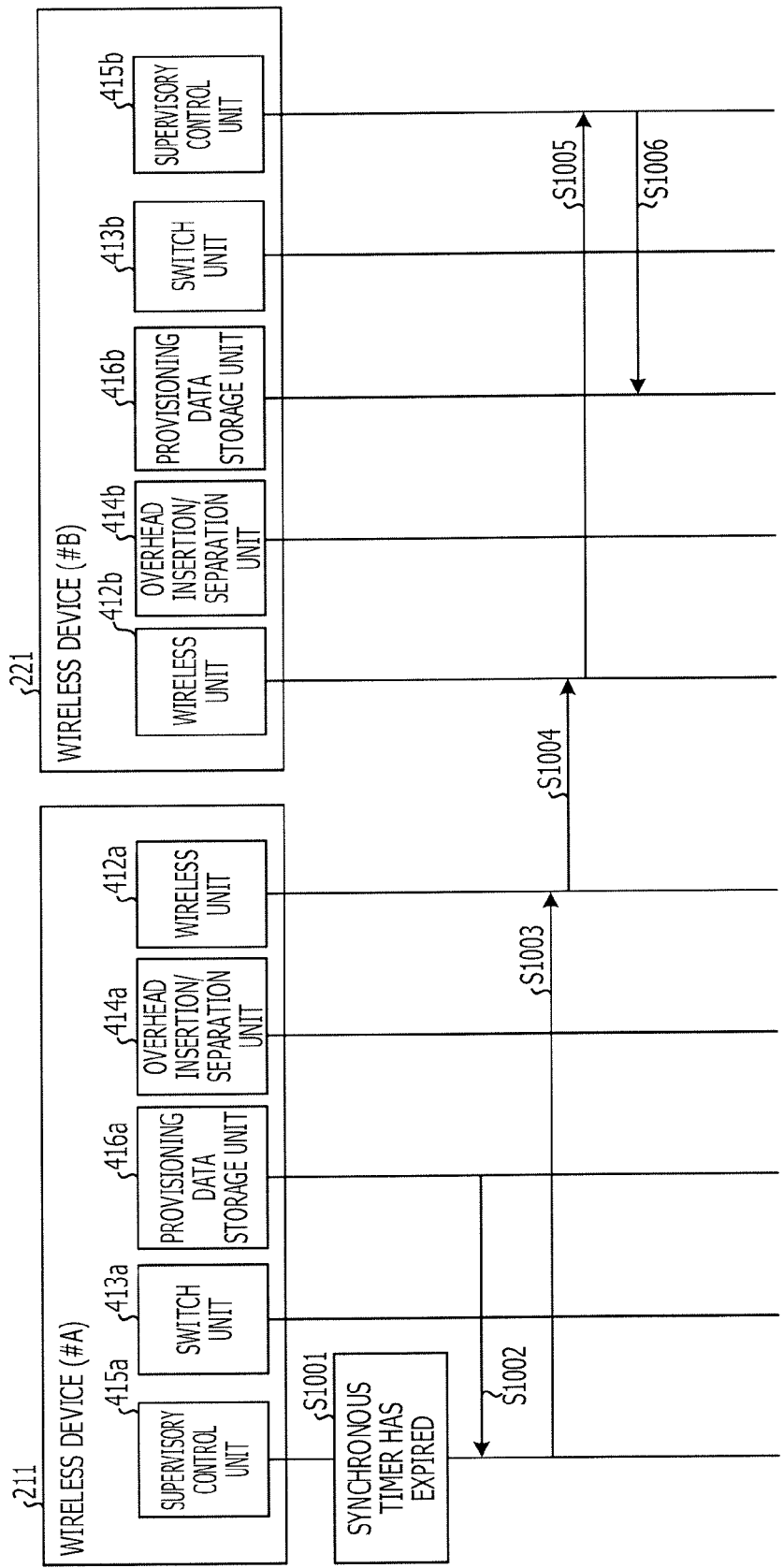
FIG. 20 is a sequence diagram illustrating an example of a process of delivery of provisioning data performed by a communication system.

FIG. 20 is a sequence diagram illustrating an example of a process of delivery of provisioning data performed by a communication system. In FIG. 20, the wireless unit 412, the switch unit 413, the overhead insertion/separation unit 414, the supervisory control unit 415, and the provisioning data storage unit 416 of the wireless device 211 (#A) are referred to as a wireless unit 412a, a switch unit 413a, an overhead insertion/separation unit 414a, a supervisory control unit 415a, and a provisioning data storage unit 416a, respectively. Also, the wireless unit 412, the switch unit 413, the overhead insertion/separation unit 414, the supervisory control unit 415, and the provisioning data storage unit 416 of the wireless device 221 (#B) are referred to as a wireless unit 412b, a switch unit 413b, an overhead insertion/separation unit 414b, a supervisory control unit 415b, and a provisioning data storage unit 416b, respectively. The same applies in the subsequent drawings.

The wireless device 211 and the wireless device 221 may perform the following flow under normal operations, for example. First, it is assumed that the synchronous timer has expired in the supervisory control unit 415a of the wireless device 211 (S1001). In this case, the supervisory control unit 415a may read the provisioning data (#A) of the wireless device 211 from the provisioning data storage unit 416a (S1002).

Then, the supervisory control unit 415a may output the provisioning data (#A) read at S1002 to the wireless unit 412a (S1003). Then, the wireless unit 412a may wirelessly transmit the provisioning data (#A) output at S1003 to the wireless device 221 (S1004).

Then, the wireless unit 412b of the wireless device 221 may receive the provisioning data (#A) wirelessly transmitted at S1004 and may output the received provisioning data (#A) to the supervisory control unit 415b (S1005). Then, the supervisory control unit 415b may store the provisioning data (#A) output at S1005 in the provisioning data storage unit 416b (S1006), and end the process of delivery of provisioning data.

In this way, the wireless device 211 may transmit the provisioning data (#A) to the wireless device 221 (the counterpart station) utilizing the supervisory control line provided in the wireless link under normal operations. The wireless device 221 may store the provisioning data (#A) transmitted from the wireless device 211 as backup data in the provisioning data storage unit 416b in the wireless device 221.

Although the case where the provisioning data (#A) of the wireless device 211 is transmitted to the wireless device 221 and is stored in the wireless device 221 has been described, the provisioning data (#B) of the wireless device 221 may also be transmitted to the wireless device 211 and stored in the wireless device 211.

Figure 21:
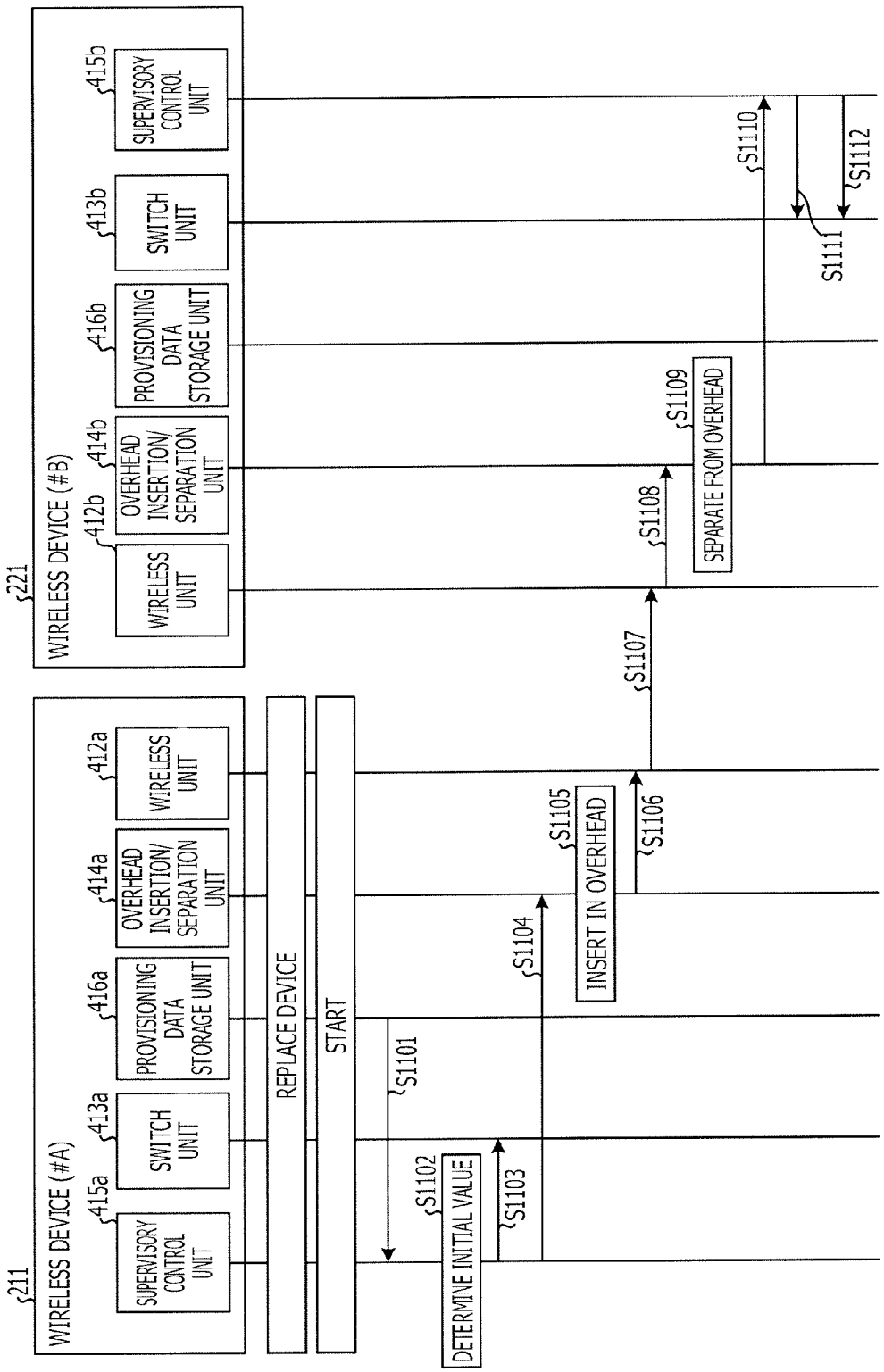
FIG. 21 is a sequence diagram illustrating an example of a process of setting performed by a communication system.
Figure 22:
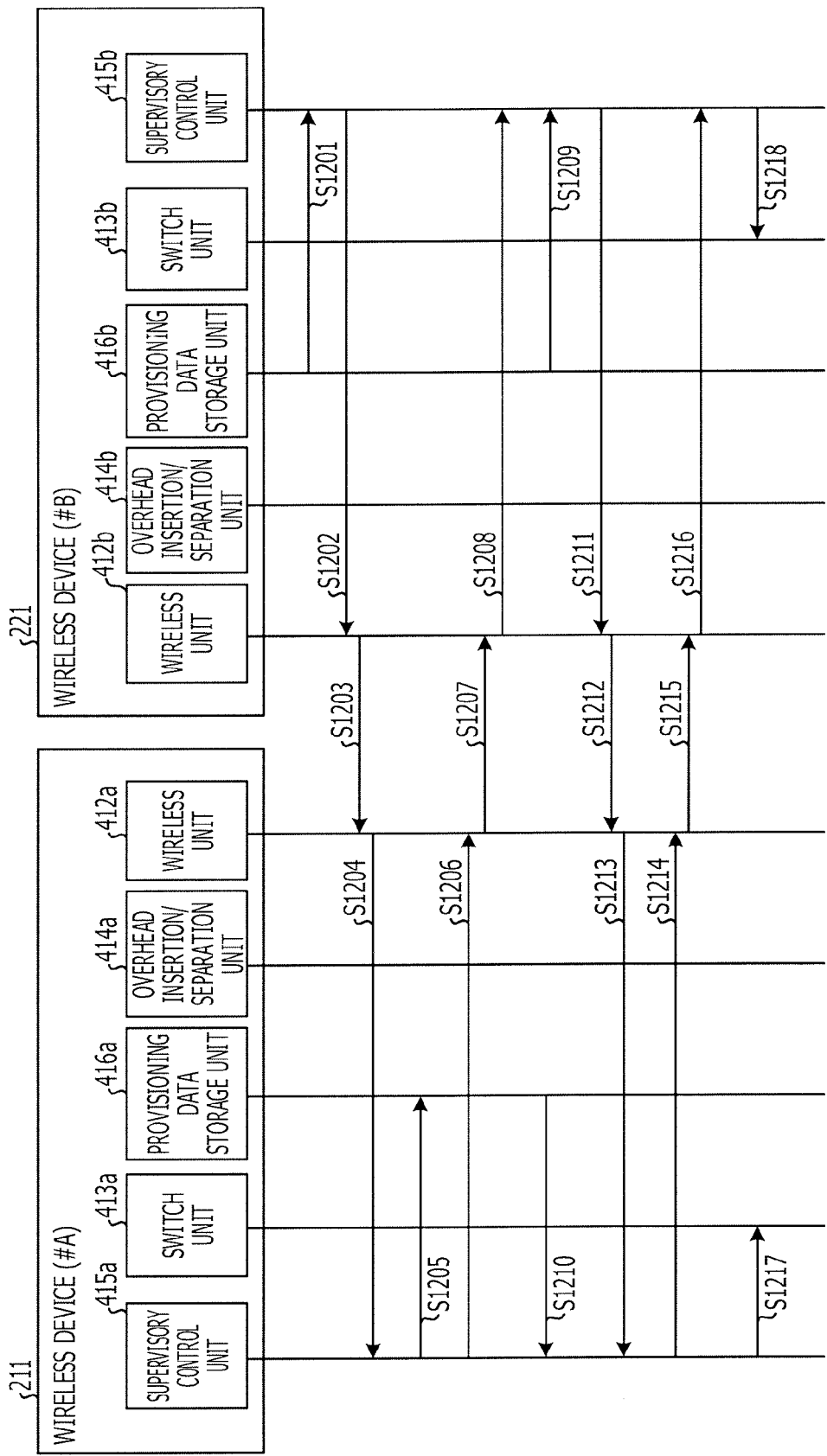
FIG. 22 is a sequence diagram illustrating an example of a process of setting performed by a communication system.

FIG. 21 is a sequence diagram (part 1) illustrating an example of a process of setting performed by a communication system. FIG. 22 is a sequence diagram (part 2) illustrating an example of a process of setting performed by a communication system. After the process of delivery of provisioning data as illustrated in FIG. 20, it is assumed that the wireless device 211 is replaced and the new wireless device 211 is started as illustrated in FIG. 21. In this case, the wireless device 211 and the wireless device 221 may perform the following flow, for example.

First, the supervisory control unit 415a of the started wireless device 211 may read the provisioning data (#A) of the wireless device 211 from the provisioning data storage unit 416a (S1101). Then, it is assumed that the supervisory control unit 415a determines that the provisioning data (#A) read at S1101 is an initial value at the time of shipment from the factory (S1102). In this case, the supervisory control unit 415a may output an instruction for line severance to the switch unit 413a (S1103). Thus, connection at the line-side port of the wireless device 211 may be severed.

Then, the supervisory control unit 415a may output a default startup flag to the overhead insertion/separation unit 414a (S1104). Then, the overhead insertion/separation unit 414a may insert the default startup flag output at S1104 in the overhead of a transmission signal that is to be transmitted to the wireless device 221 (S1105).

Then, the overhead insertion/separation unit 414a may output the transmission signal with the overhead in which the default startup flag has been inserted at S1105, to the wireless unit 412a (S1106). Then, the wireless unit 412a may wirelessly transmit the transmission signal output at S1106 to the wireless device 221 (S1107).

Then, the wireless unit 412b of the wireless device 221 may receive the transmission signal transmitted at S1107 and output the received transmission signal to the overhead insertion/separation unit 414b (S1108). Then, the overhead insertion/separation unit 414b may separate the default startup flag from the transmission signal output at S1108 (S1109).

Then, the overhead insertion/separation unit 414b may output the default startup flag separated at S1109 to the supervisory control unit 415b (S1110). Then, the supervisory control unit 415b may output an instruction for line severance to the switch unit 413b (S1111). In response to the instruction, connection at the line-side port of the wireless device 221 may be severed.

The supervisory control unit 415b may output an instruction for IP change to the switch unit 413b (S1112). In response to the instruction, the IP address of the wireless device 221 may be set to a predetermined IP address (for example, "192. 168. XXX. XX2") based on the factory default provisioning data. The IP address set at S1112 is an address available for network connection with the wireless device 211 having a network parameter at the time of shipment from the factory.

Then, the wireless devices 211 and 221 may shift to S1201 of FIG. 22. That is, the supervisory control unit 415b of the wireless device 221 may read the provisioning data (#A) of the wireless device 211 from the provisioning data storage unit 416b (S1201). Then, the supervisory control unit 415b may output the provisioning data (#A) read at S1201 to the wireless unit 412b (S1202). Then, the wireless unit 412b may wirelessly transmit the provisioning data (#A) output at S1202 to the wireless device 211 (S1203).

Then, the wireless unit 412a of the wireless device 211 may receive the provisioning data (#A) wirelessly transmitted at S1203 and output the received provisioning data (#A) to the supervisory control unit 415a (S1204). Then, the supervisory control unit 415a may store the provisioning data (#A) output at S1204 in the provisioning data storage unit 416a (S1205).

Then, the supervisory control unit 415a may output a reception notification to the wireless unit 412a (S1206). Then, the wireless unit 412a may wirelessly transmit the reception notification output at S1206 to the wireless device 221 (S1207).

Then, the wireless unit 412b of the wireless device 221 may output the reception notification wirelessly transmitted at S1207, to the supervisory control unit 415b (S1208). Then, the supervisory control unit 415b may read the provisioning data (#B) of the wireless device 221 from the provisioning data storage unit 416b (S1209). Thus, the network parameter may return to the original state and the provisioning data transmission mode may be canceled.

Also, the supervisory control unit 415a of the wireless device 211 may set a provisioning data reception flag, and restart the wireless device 211. Then, the supervisory control unit 415a of the wireless device 211 may read the provisioning data (#A) of the wireless device 211 from the provisioning data storage unit 416a (S1210).

Then, the supervisory control unit 415b of the wireless device 221 may output a connection check signal to the wireless unit 412b (S1211). Then, the wireless unit 412b may wirelessly transmit the connection check signal output at S1211 to the wireless device 211 (S1212).

Then, the wireless unit 412a of the wireless device 211 may receive the connection check signal wirelessly transmitted at S1212 and output the received connection check signal to the supervisory control unit 415a (S1213). Then, the supervisory control unit 415a may output a notification of the success of connection to the wireless unit 412a (S1214). Then, the wireless unit 412a may wirelessly transmit the notification of the success of connection output at S1214 to the wireless device 221 (S1215).

Then, the wireless unit 412b of the wireless device 221 may receive the notification of the success of connection wirelessly transmitted at S1215, and output the received notification to the supervisory control unit 415b (S1216). Also, the supervisory control unit 415a of the wireless device 211 may output an instruction for line connection to the switch unit 413a (S1217). In response to the instruction, connection at the line-side port of the wireless device 211 may be established. Also, the supervisory control unit 415b of the wireless device 221 may output an instruction for line connection to the switch unit 413b (S1218). In response to the instruction, connection at the line-side port of the wireless device 221 may be established.

Process of Communication System Under Abnormal Situation

The line of wireless communication may be unstable compared with wired communication, and therefore a packet loss and so on may be taken into consideration in a setup of provisioning.

Figure 23:
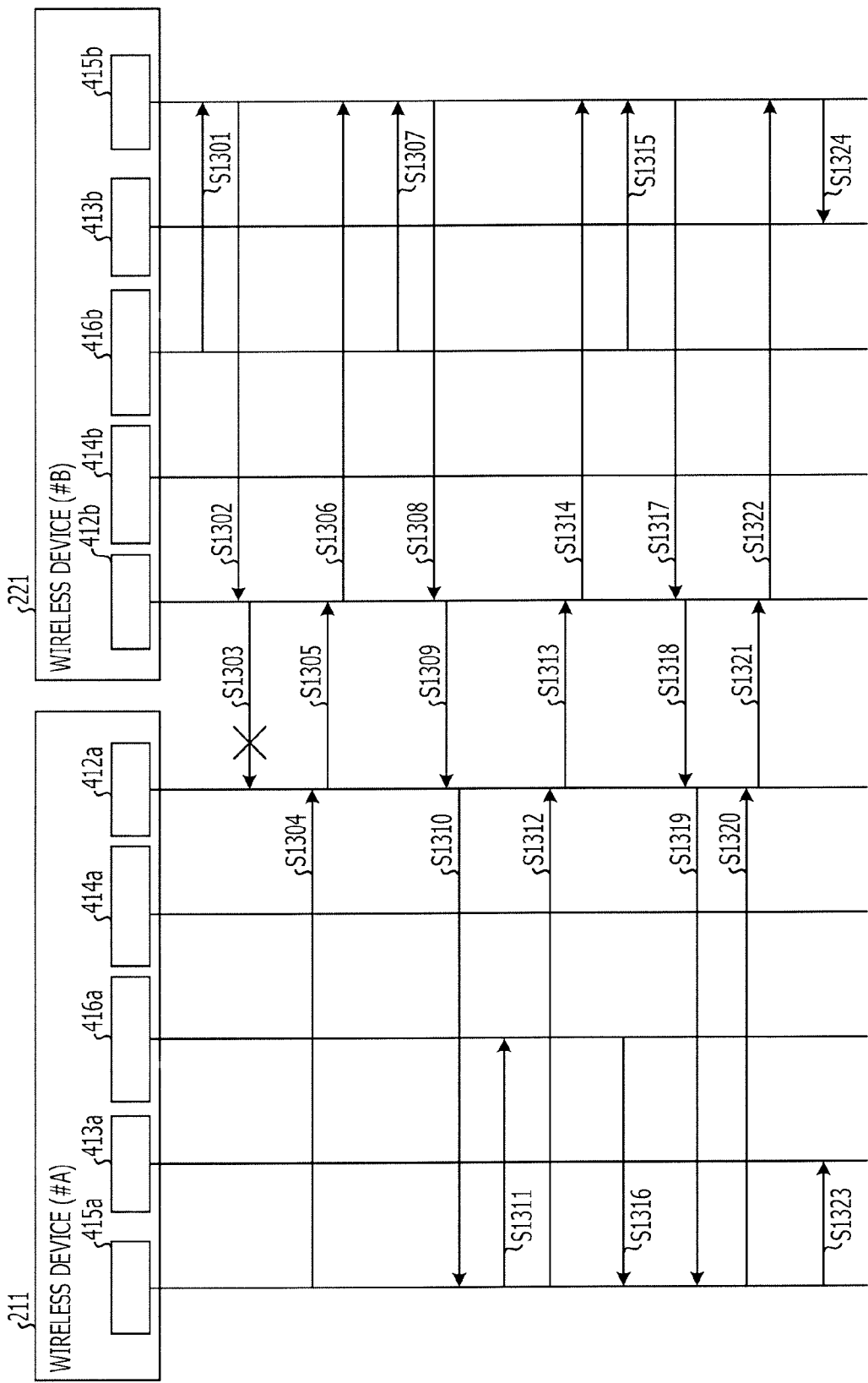
FIG. 23 is a sequence diagram illustrating a first example of a process under an abnormal situation performed by a communication system.

FIG. 23 is a sequence diagram illustrating a first example of a process under an abnormal situation performed by a communication system. The case where a trouble occurs in the middle of the flow illustrated in FIG. 22 will be described. After the flow illustrated in FIG. 21 is performed, the supervisory control unit 415b of the wireless device 221 may first read the provisioning data (#A) of the wireless device 211 from the provisioning data storage unit 416b (S1301).

Then, the supervisory control unit 415b may output the provisioning data (#A) read at S1301 to the wireless unit 412b (S1302). Then, the wireless unit 412b may wirelessly transmit the provisioning data (#A) output at S1302 to the wireless device 211 (S1303). It is assumed, at this point, the provisioning data (#A) transmitted from the wireless device 221 is not normally received by the wireless device 211.

In this case, the supervisory control unit 415a of the wireless device 211 may output a retransmission request to the wireless unit 412a (S1304). Then, the wireless unit 412a may wirelessly transmit the retransmission request output at S1304 to the wireless device 221 (S1305).

Then, the wireless unit 412b of the wireless device 221 may output the retransmission request wirelessly transmitted at S1305 to the supervisory control unit 415b (S1306). Then, the supervisory control unit 415b may read again the provisioning data (#A) of wireless device 211 from the provisioning data storage unit 416b (S1307).

Then, the supervisory control unit 415b may output the provisioning data (#A) read at S1307 to the wireless unit 412b (S1308). Then, the wireless unit 412b may wirelessly transmit the provisioning data (#A) output at S1308 to the wireless device 211 (S1309).

Thus, it is regarded that the provisioning data (#A) transmitted from the wireless device 221 has been normally received by the wireless device 211. The operations of S1310 to S1324 illustrated in FIG. 23 are the same as those of S1204 to S1218 illustrated in FIG. 22.

FIG. 24 is a sequence diagram illustrating a second example of a process under an abnormal situation performed by a communication system. The case where a trouble occurs in the middle of the flow illustrated in FIG. 22 will be described. The operations of S1401 to S1405 illustrated in FIG. 24 are the same as those of S1301 to S1305 illustrated in FIG. 23. However, it is assumed that the retransmission request wirelessly transmitted at S1405 is not received by the wireless device 221.

Here, it is assumed that the reception notification waiting timer has expired in the wireless device 221 (S1406). In this case, the supervisory control unit 415b of the wireless device 221 may output an instruction for line connection to the switch unit 413b (S1407). In response to the instruction, connection at the line-side port of the wireless device 221 may be established. Also, the supervisory control unit 415b may notify the user of the possibility of failure in setting (S1408), and end a series of processing.

According to above-described method for setting network information in a communication device, a communication system, and a communication device, the setting of a replaced wireless device may be performed automatically.

All examples and conditional language recited herein are intended for pedagogical purposes to aid the reader in understanding as parts of the invention and the concepts contributed by the inventor(s) to furthering the art, and are to be construed as being without limitation to such specifically recited examples and conditions, nor does the organization of such examples in the specification relate to a showing of the superiority and/or inferiority of various aspects of the invention. Although example embodiment of the present invention has been described in detail, it should be understood that the various changes, substitutions, and alterations could be made hereto without departing from the spirit and scope hereof.

What is claimed is:

1. A method for setting network information in a communication device, the method comprising:
communicating, by a first communication device, with an intended reception device being a second communication device based on first setting information stored in a first storage unit of the first communication device;
transmitting, by the first communication device, the first setting information to the second communication device;
storing, by the second communication device, the first setting information received from the first communication device in a second storage unit;
transmitting upon startup, by the first communication device, when an initial value is stored in the first storage unit prior to startup of the first communication device, a request signal to the second communication device after first hardware of the first communication device is replaced;
receiving, by the first communication device, the first setting information stored in the second storage unit from the second communication device after the first hardware is replaced; and
storing, by the first communication device, the first setting information received from the second communication device in the first storage unit of the first communication device by replacing the initial value, after the first hardware is replaced;
wherein
the first communication device is connected to a third communication device different from the second communication device,
the first communication device communicates with the second communication device and the third communication device based on the first setting information stored in the first storage unit,
the second communication device is connected to a fourth communication device different from the first communication device,
the second communication device communicates with the first communication device and the fourth communication device,
the first communication device sets for the first communication device a first address based on the initial value to transmit the request signal to the second communication device when the initial value is stored in the first storage unit upon startup of the first communication device,
the second communication device sets for the second communication device, upon receiving the request signal from the first communication device, a second address available for communication with the first communication device for which the first address has been set, and
the second communication device transmits the first setting information stored in the second storage unit to the first communication device.

2. The method according to claim 1, wherein
the first communication device severs a communication path with the third communication device when the first address is set for the first communication device.

3. The method according to claim 2, wherein
the first communication device sets for the first communication device a third address based on the first setting information stored in the first storage unit after replacing the initial value stored in the first storage unit with the first setting information received from the second communication device, and
the first communication device establishes connection of the communication path with the third communication device.

4. The method according to claim 1, wherein
the second communication device severs a communication path with the fourth communication device when the second address is set for the second communication device.

5. The method according to claim 4, wherein
the second communication device sets for the second communication device a fourth address available for communication with the fourth communication device after severing the communication path and transmitting the first setting information stored in the second storage unit, and the second communication device establishes connection of the communication path with the fourth communication device.

6. The method according to claim 1, wherein the second communication device communicates with the first communication device based on second setting information stored in a third storage unit of the second communication device, the second communication device transmits the second setting information to the first communication device, the first communication device stores the second setting information received from the second communication device in a fourth storage unit, the second communication device receives the second setting information stored in the fourth storage unit from the first communication device after second hardware of the second communication device is replaced, and the second communication device stores the received second setting information in the third storage unit of the second communication device after the second hardware is replaced.

7. A communication system, comprising:

a first communication device including a first memory and a first processor coupled to the first memory; and a second communication device including a second memory and a second processor coupled to the second memory, wherein the first processor is configured to:

perform communications with an intended reception device being the second communication device based on first setting information stored in the first memory, and transmit the first setting information to the second communication device, the second processor is configured to:

receive the first setting information from the first communication device, and store the first setting information received from the first communication device in the second memory, the first processor is further configured to:

transmit upon startup, when an initial value is stored in the first memory prior to startup, a request signal to the second communication device after hardware of the first communication device is replaced, receive the first setting information stored in the second memory from the second communication device after the hardware of the first communication device is replaced, and store the first setting information received from the second communication device in the first memory of the first communication device by replacing the initial value, after the hardware is replaced;

wherein the first communication device is connected to a third communication device different from the second communication device, the first communication device communicates with the second communication device and the third communication device based on the first setting information stored in the first memory, the second communication device is connected to a fourth communication device different from the first communication device, the second communication device communicates with the first communication device and the fourth communication device, the first communication device sets for the first communication device a first address based on the initial value to transmit the request signal to the second communication device when the initial value is stored in the first memory upon startup of the first communication device, the second communication device sets for the second communication device, upon receiving the request signal from the first communication device, a second address available for communication with the first communication device for which the first address has been set, and the second communication device transmits the first setting information stored in the second memory to the first communication device.

8. A communication device, comprising:

a memory;

a processor coupled to the memory and the processor configured to:

store setting information in the memory;

perform wireless communication with an intended counterpart device based on the setting information stored in the memory, transmit the setting information to the counterpart device, transmit upon startup, when an initial value is stored in the memory prior to startup, a request signal to the counterpart device after hardware of the communication device is replaced, receive the setting information from the counterpart device after the hardware of the communication device is replaced, and store the setting information received from the counterpart device in the memory of the communication device after the hardware is replaced;

wherein the communication device is connected to a second communication device different from the counterpart device, the communication device communicates with the counterpart device and the second communication device based on the setting information stored in the memory, the counterpart device is connected to a third communication device different from the communication device, and the counterpart device communicates with the communication device and the third communication device, the communication device sets for the communication device a first address based on the initial value to transmit the request signal to the counterpart device when the initial value is stored in the memory upon startup of the communication device, the counterpart device sets for the counterpart device, upon receiving the request signal from the communication device, a second address available for communication with the communication device for which the first address has been set, and the counterpart device transmits the setting information stored in a second memory to the communication device.

* * * * *